(12) United States Patent
Harada et al.

(10) Patent No.: US 8,068,202 B2
(45) Date of Patent: Nov. 29, 2011

(54) LIQUID CRYSTAL DEVICE

(75) Inventors: Norihito Harada, Azumino (JP);
Katsuhiro Imai, Minowa-machi (JP)

(73) Assignee: Sony Corporation, Tokyo (JP)

( * ) Notice: Subject to any disclaimer, the term of this patent is extended or adjusted under 35 U.S.C. 154(b) by 1000 days.

(21) Appl. No.: 11/984,524

(22) Filed: Nov. 19, 2007

(65) Prior Publication Data

US 2008/0225194 A1 Sep. 18, 2008

(30) Foreign Application Priority Data

Mar. 15, 2007 (JP) ................................. 2007-066294
Sep. 27, 2007 (JP) ................................. 2007-250751

(51) Int. Cl.
*G02F 1/135* (2006.01)
*G02F 1/136* (2006.01)
*G02F 1/1343* (2006.01)

(52) U.S. Cl. .......... 349/141; 349/142; 349/149; 349/43; 349/49

(58) Field of Classification Search ........... 349/141–149
See application file for complete search history.

(56) References Cited

U.S. PATENT DOCUMENTS

| | | | |
|---|---|---|---|
| 6,449,026 B1 | 9/2002 | Min et al. | |
| 6,784,964 B2 * | 8/2004 | Nakayoshi et al. | 349/139 |
| 7,502,084 B2 * | 3/2009 | Nishimura | 349/114 |
| 2007/0242204 A1 * | 10/2007 | Fujita et al. | 349/141 |

FOREIGN PATENT DOCUMENTS

| | | |
|---|---|---|
| JP | A 2001-83540 | 3/2001 |
| JP | A 2003-029289 | 1/2003 |
| JP | A-2007-57752 | 3/2007 |
| KR | 2001-0003748 A | 1/2001 |
| KR | 10-2005-0067735 A | 7/2005 |
| KR | 10-2006-0098536 A | 9/2006 |

* cited by examiner

*Primary Examiner* — Huyen Ngo
(74) *Attorney, Agent, or Firm* — K&L Gates LLP

(57) ABSTRACT

A liquid crystal device includes a first substrate and a second substrate opposite each other with a liquid crystal layer interposed therebetween, wherein the first substrate includes a signal line, a switching element electrically connected to the signal line, a first electrode electrically connected to the switching element, a wiring line, a dielectric film covering the first electrode, the switching element, and the wiring line, and a second electrode disposed on the dielectric film so as to be opposite the first electrode, and wherein the second electrode is drawn from the dielectric film toward an area where the dielectric film does not exist and is electrically connected to the wiring line through the area where the dielectric film does not exist.

22 Claims, 17 Drawing Sheets

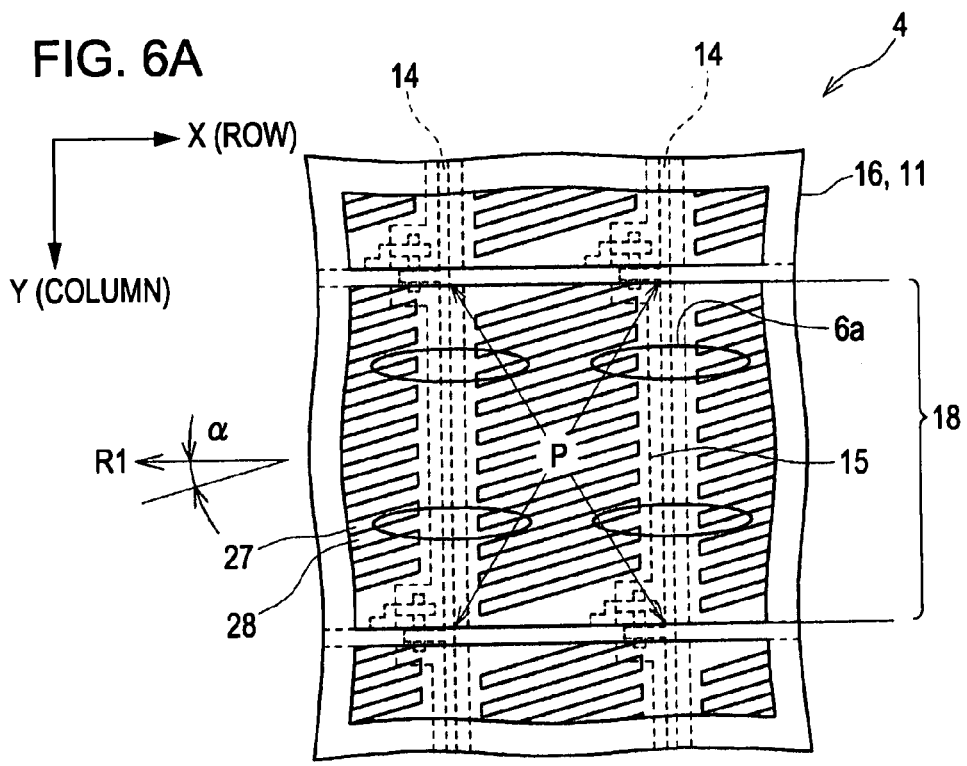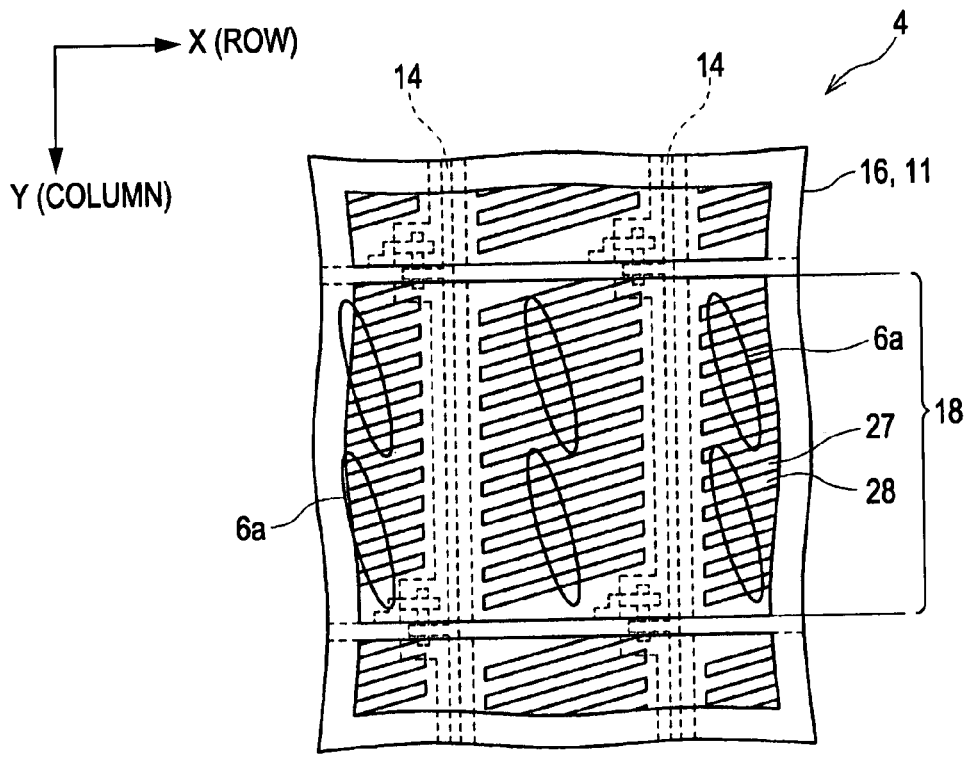

LIQUID CRYSTAL DEVICE

BACKGROUND

1. Technical Field

The present invention relates to a liquid crystal device with a fringe field switching (FFS) mode which is a transverse electric field switching mode.

2. Related Art

Presently, liquid crystal devices are widely used in electronic apparatuses such as cellular phones, portable information terminals, and personal digital assistants (PDAs). Among liquid crystal devices, there is known an FFS mode liquid crystal device in which first electrodes and second electrodes are disposed on one substrate with a dielectric film interposed therebetween, the second electrodes are each formed by a plurality of line-shaped electrode portions disposed parallel to each other with gaps interposed therebetween, and the first electrodes are formed by planar electrodes. In this case, as a switching element, a thin-film transistor (TFT), which is a three-terminal switching element, is used (for example, JP-A-2001-83540 (Pages 4 and 5, FIG. 3)).

As an active matrix type liquid crystal device, there is known a liquid crystal device which uses a thin-film diode (TFD) element, which is a two-terminal switching element, as a switching element for driving a plurality of pixels to be turned ON (white display) or OFF (black display). In addition, there is known a liquid crystal device which uses a thin-film transistor (TFT) element, which is a three-terminal switching element, as a switching element (for example, see JP-A-2003-29289 (page 5, FIG. 1)).

The liquid crystal device disclosed in JP-A-2001-83540 is a transverse electric field type liquid crystal device in which the first electrodes are disposed on one of a pair of substrates bonded by a seal member and the second electrodes are disposed on the other thereof. Wiring lines are electrically connected to the first electrodes and the second electrodes to supply necessary signals. In the liquid crystal device disclosed in JP-A-2003-29289, the second electrodes and the wiring lines for supplying signals to the second electrodes are disposed in different substrates and electrically connected to each other through conductive members disposed in an inner side of a seal member.

The FFS mode liquid crystal device disclosed in JP-A-2001-83540 can realize characteristics of a wide viewing angle and a high-contrast display, compared with a vertical electric field switching type liquid crystal device which is a popular type of liquid crystal device that operates in a twisted nematic (TN) mode.

However, in the liquid crystal device disclosed in JP-A-2001-83540, the TFT element, which is a three-terminal switching element, is used as a switching element for controlling a voltage applied to pixels. Accordingly, problems arise in that the configuration of the elements disposed on substrates is complex, manufacturing processes are complicated, and manufacturing cost is high.

Therefore, inventors have simplified the configuration of a transverse electric field type liquid crystal device using a TFD element, which is a two-terminal switching element, disclosed in JP-A-2003-29289. However, when an FFS mode liquid crystal device is configured using a TFD element, the plurality of second electrodes and the plurality of wiring lines electrically connected to the second electrodes are disposed on the same substrate. Such a configuration is different from that in the vertical electric field type liquid crystal device. Accordingly, the second electrodes may be short-circuited in accordance with the configuration of the wiring lines.

Such a problem is not limited to the case where a TFD element is used, but may also occur in the case where a TFT element, which is a three-terminal switching element, is used. In order to avoid this problem, a configuration in which the wiring lines are electrically insulated from the second electrodes is necessary. However, if the electrical insulation configuration is provided only for the wiring lines and the second electrodes, the configuration of the liquid crystal device may not be sufficiently simplified. Moreover, if the electrical insulation configuration is provided, there may be restrictions on the configuration of the wiring lines and the electrodes on the substrate. Accordingly, the configuration of the elements disposed on the substrate may not be simplified.

SUMMARY

An advantage of some aspects of the invention is that it provides a transverse electric type liquid crystal device which has a configuration for electrically insulating wiring lines and electrodes disposed thereon.

According to an aspect of the invention, there is provided a liquid crystal device including a first substrate and a second substrate opposite each other with a liquid crystal layer interposed therebetween, wherein the first substrate includes a signal line, a switching element electrically connected to the signal line, a first electrode electrically connected to the switching element, a wiring line, a dielectric film covering the first electrode, the switching element, and the wiring line, and a second electrode disposed on the dielectric film so as to be opposed to the first electrode, and wherein the second electrode is drawn from the dielectric film toward an area where the dielectric film does not exist and is electrically connected to the wiring line through the area where the dielectric film does not exist.

According to the liquid crystal device with the above-described configuration, a transverse electric field type switching mode such as an FFS mode can be realized. Since the FFS mode controls an optical property of the liquid crystal molecules by use of an electric field parallel to a substrate, a so-called transverse electric field, the FFS mode can realize a wider viewing angle and higher contrast, compared with a vertical electric field which is a popular type of a TN mode. The liquid crystal device with the above-described configuration is configured so that the second electrode is exposed from the dielectric film toward the area where the dielectric film does not exist and the second electrode and the wiring line are electrically connected to each other in the area where the dielectric film does not exist. Accordingly, according to the liquid crystal device with the above-described configuration, the wiring line and an element connected to the wiring line can be insulated from the second electrode by using the dielectric film capable of insulating the first electrode and the second electrode from each other. Accordingly, it is not necessary to provide a structure for insulating the wiring line. As a result, it is possible to easily form the configuration for electrically insulating the wiring line and the second electrode. In addition, according to the liquid crystal device with the above-described configuration, when the wiring line and the second electrode are electrically connected to each other, the area where the dielectric film does not exist is used. Accordingly, it is possible to prevent the electrical connection between the wiring line and the second electrode from being deteriorated by the dielectric film. Therefore, a good connection can be achieved.

In the liquid crystal device with the above-described configuration, the second electrode may be electrically connected to the wiring line in the area where the dielectric film does not exist.

In the liquid crystal device with the above-described configuration, the second electrode may be electrically connected directly to the wiring line. In addition, the second electrode may be electrically connected to the wiring line through a relay electrode.

In the liquid crystal device with the above-described configuration, the wiring line may have a portion exposed from an end of the dielectric film in plan view, and the second electrode may be electrically connected to the portion of the wiring line exposed from the dielectric film.

In the liquid crystal device with the above-described configuration, a contact hole in which the dielectric film may be removed in a thickness direction thereof is formed at a position of the dielectric film overlapping the wiring line in plan view, and the second electrode may be electrically connected to the wiring line through the contact hole. Even with such a configuration, the dielectric film can be used to electrically insulate the first electrode and the second electrode from each other. Accordingly, it is not necessary to provide the structure for insulating the wiring line. As a result, it is possible to easily form the configuration for electrically insulating the wiring line and the second electrode.

In the liquid crystal device with the above-described configuration, a contact hole in which the dielectric film may be removed in a thickness direction thereof is formed at a position of the dielectric film overlapping the second electrode in plan view, and the second electrode may be electrically connected to the wiring line through the contact hole.

In the liquid crystal device with the above-described configuration, the switching element may be a two-terminal switching element including a first conductive film, an insulating film disposed on the first conductive film, and a second conductive film disposed on the insulating film. With such a configuration, the manufacture of the liquid crystal device can be more simplified, compared with a case where a three-terminal switching element is used, thereby reducing manufacturing cost. In this case, the wiring line may be formed on the same layer as one of the first conductive film and the second conductive film. With such a configuration, it is not necessary to further provide a new conductive film when the wiring line is formed. Accordingly, the manufacture of the liquid crystal device can be more simplified, thereby reducing the manufacturing cost.

In the liquid crystal device with the above-described configuration, the switching element may be a three-terminal switching element which has a semiconductor layer including a source region electrically connected to the signal line, a channel region, and a drain region electrically connected to the first electrode and a gate electrode opposite the channel region with a gate insulating layer interposed therebetween. In this case, the wiring line may be formed on the same layer as one of the gate electrode and the signal line. With such a configuration, it is not necessary to further provide a new conductive film when the wiring line is formed. Accordingly, the manufacture of the liquid crystal device can be more simplified, thereby reducing the manufacturing cost.

In the liquid crystal device with the above-described configuration, a plurality of the signal lines may extend in parallel on the first substrate in the same direction, a plurality of the first electrodes may be disposed on the first substrate in an extension direction of the signal lines and in a direction intersecting the extension direction of the signal lines, and the second electrode may be a strip-shaped electrode extending in the direction intersecting the extension direction of the signal lines and overlapping the plurality of first electrodes in plan view, a plurality of the strip-shaped electrodes are arranged in parallel at a predetermined interval in the extension direction of the signal lines. With such a configuration, the second electrodes can serve as a common electrode which is commonly used with the plurality of first electrodes.

In this case, a display area may be formed by an area in which a plurality of sub-pixels where the first electrodes and the second electrodes overlap each other in plan view are arranged, and the wiring lines may be disposed in an area outside the display area in plan view. With such a configuration, the plurality of first electrodes and the plurality of second electrodes can be effectively disposed in a narrow area of the substrate.

In the liquid crystal device with the above-described configuration, the wiring lines may be disposed on both sides of the display area in the area outside the display area. With such a configuration, the plurality of first electrodes and the plurality of second electrodes can be more effectively disposed in a narrow area of the substrate.

In the liquid crystal device with the above-described configuration, each of the wiring lines may have a first portion extending in the direction intersecting the extension direction of the second electrodes and a second portion connected to the first portion so as to extend in a direction parallel to the second electrodes.

In the liquid crystal device with the above-described configuration, the second portion may extend from the first portion to a side opposite the display area. The configuration ensures that the wiring line can be exposed and the wiring line and the second electrode can be electrically connected to each other in the exposed portion just by forming the dielectric film in the display area and the vicinity of the display area and by configuring the dielectric film so as not to exist on the outside.

In the liquid crystal device with the above-described configuration, the second portion may extend from the first portion to a side of the display area.

In the liquid crystal device with the above-described configuration, a width W1 of the second portion in a direction perpendicular to the extension direction of the second portion may be larger than a width W0 of the first portion in a direction perpendicular to the extension direction of the first portion. With such a configuration, the second electrode and the first portion of the wiring line can come in contact with each other more broadly. Accordingly, it is possible to electrically connect the second electrode and the wiring line more reliably.

In the liquid crystal device with the above-described configuration, the second electrodes may have a plurality of line-shaped electrode portions arranged in parallel with a gap in areas opposite the first electrodes. With such a configuration, it is possible to effectively form a fringe field.

In this case, the gaps and the line-shaped electrode portions of the second electrodes may be formed every sub-pixel. With such a configuration, it is possible to ensure a wider area of the second electrode, thereby maintaining lower wiring resistance.

In the liquid crystal device with the above-described configuration, the gaps and the line-shaped electrode portions of the second electrodes may be formed continuously over the plurality of sub-pixels. With such a configuration, it is possible to facilitate the patterning of the gaps and the line-shaped electrode portions.

In the liquid crystal device with the above-described configuration, a part or all of the line-shaped electrode portions of the second electrodes may overlap the first electrodes in plan view.

In the liquid crystal device with the above-described configuration, the first electrodes may be a planar electrode with no gap. With such a configuration, all the line-shaped electrode portions of the second electrode overlap the first electrode in plan view, thereby realizing the FFS mode.

In addition to the planar electrode, the first electrodes may be formed by the gaps and the line-shaped electrode portions like the second electrode. In this case, some of the line-shaped electrode portions of the second electrode may overlap the first electrode in plan view.

The liquid crystal device with the above-described configuration further includes a first alignment film and a first polarizing layer disposed on the first substrate and a second alignment film and a second polarizing layer disposed on the second substrate. In the liquid crystal device, the first alignment film and the second alignment film may be subjected to a rubbing process, and $5° \leq \alpha \leq 20°$ may be satisfied where an angle formed by the rubbing direction and an extension direction of the line-shaped electrode portions is $\alpha$, an extension direction of a polarizing transmission axis of the first polarizing layer may be parallel to the rubbing direction of the first alignment film, the rubbing direction of the second alignment film may be anti-parallel to the rubbing direction of the first substrate, and an extension direction of a polarizing transmission axis of the second polarizing layer may be perpendicular to the extension direction of the polarizing transmission axis of the first polarizing layer. With such a configuration, variation in the alignment of the liquid crystal molecules can be stabilized in the FFS mode when an on-voltage is applied. Moreover, since a threshold voltage caused by the variation in the alignment can be reduced, a high-contrast display in the FFS mode can be realized.

In the liquid crystal device with the above-described configuration, the liquid crystal layer may be formed of nematic liquid crystal molecules having a positive dielectric anisotropy. A range of the angle in the direction of the rubbing is set to be angle $\alpha$ described above. The liquid crystal device can use the liquid crystal molecules having the positive dielectric anisotropy in the liquid crystal layer. In addition, when the FFS mode is realized, the liquid crystal molecules having a negative dielectric anisotropy can be used instead of the liquid crystal molecules having the positive dielectric anisotropy. When the positive and negative dielectric anisotropies are used, it is necessary to set appropriate directions of the rubbing. Generally, a 90° difference in the appropriate directions of the rubbing is set.

The liquid crystal device with the above-described configuration is used in an electronic apparatus such as a cellular phone or a portable computer. According to the liquid crystal device with the above-described configuration, the transverse electric field type switching mode such as the FFS mode can be realized. Accordingly, it is possible to realize the wide viewing angle and the high-contrast display. In addition, since the second electrode and the wiring line is electrically insulated from each other by the dielectric film for electrically insulating the first electrode and the second electrode, the configuration for electrically insulating the wiring line and the second electrode can be easily formed. Accordingly, in the electronic apparatus having the liquid crystal device according to the invention, it is also easy to achieve a high-quality display at low cost.

BRIEF DESCRIPTION OF THE DRAWINGS

The invention will be described with reference to the accompanying drawings, wherein like numbers reference like elements.

FIG. 3A shows a state before formation of common electrodes and FIG. 3B shows a state after the formation of the common electrodes.

FIGS. 6A and 6B are top views illustrating an alignment state of liquid crystal molecules. FIG. 6A shows an initial alignment state when an off-voltage is applied and FIG. 6B shows the initial alignment state when an on-voltage is applied.

DESCRIPTION OF EXEMPLARY EMBODIMENTS

Figure 1:
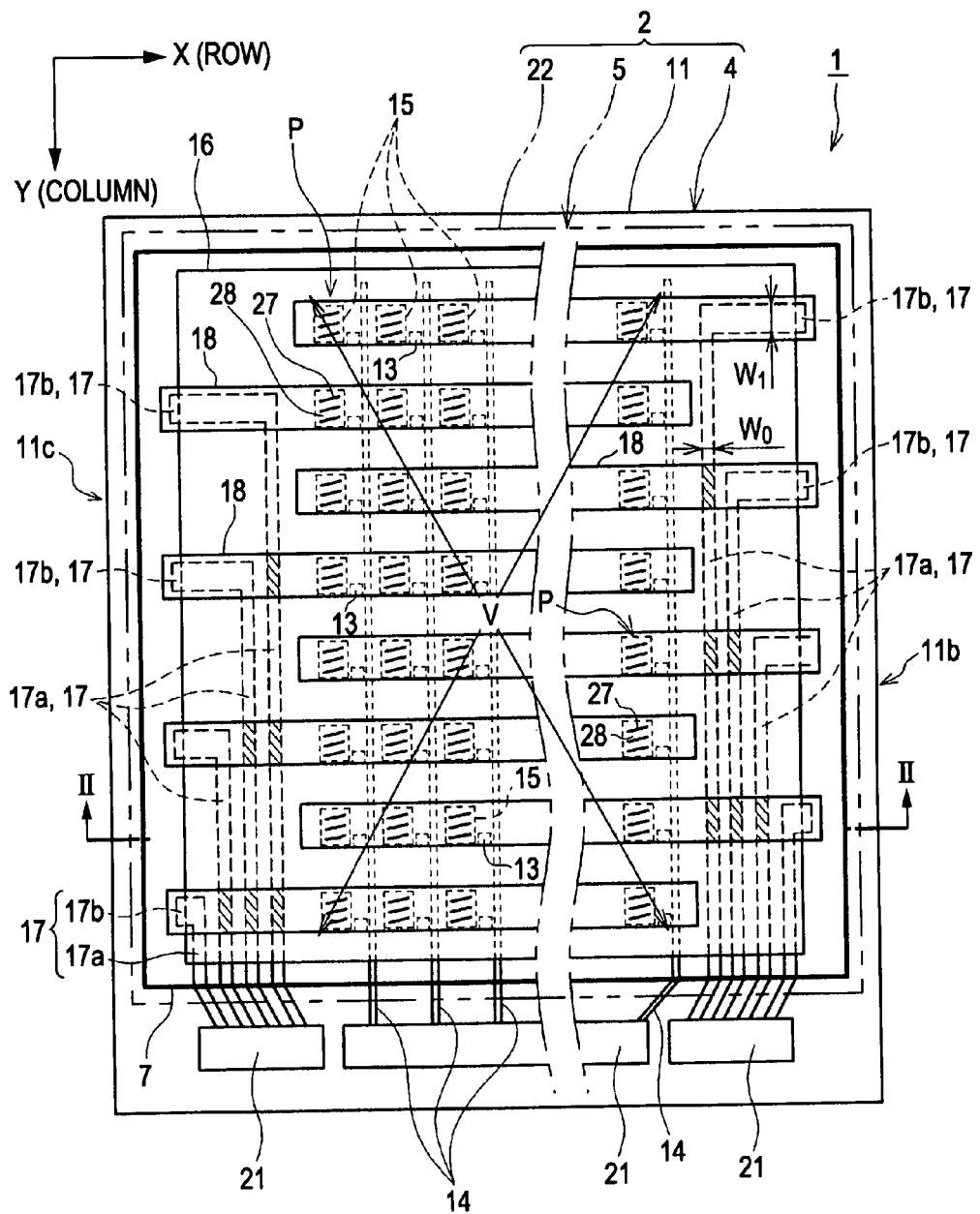
FIG. 1 is a top view illustrating a liquid crystal device according to a first embodiment of the invention.

Hereinafter, a liquid crystal device according to embodiments of the invention will be described. Of course, the invention is not limited to the embodiments. If necessary, drawings are referred to. In addition, in the drawings, scales may be different in order to make major elements among a plurality of elements easily visible.

First Embodiment of Liquid Crystal Device

Figure 2:
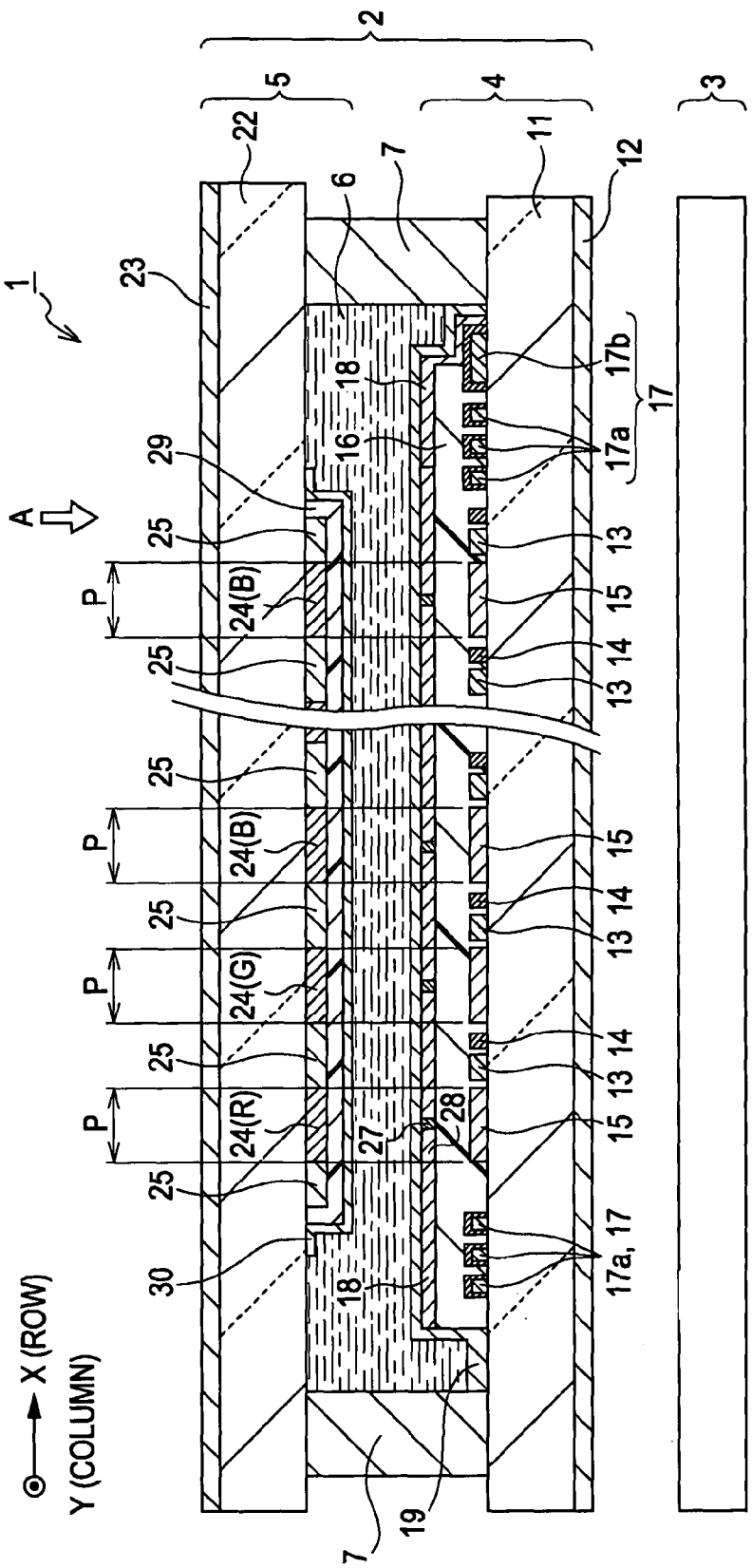
FIG. 2 is a sectional view illustrating the liquid crystal device taken along the line ZB-ZB' shown in FIG. 1.

FIG. 1 is a top view illustrating a configuration of a liquid crystal device according to a first embodiment of the invention. FIG. 2 is a sectional view illustrating the liquid crystal device in a row direction X taken along the line ZB-ZB' shown in FIG. 1. In FIG. 1, right and left directions refer to the row direction X and upward and downward directions refer to a column direction Y. In FIG. 2, the right and left directions refer to the row direction X and a vertical direction refers to a row direction Y. The row direction X and the column direction Y are perpendicular to each other. In the first embodiment, the row direction X is a width direction of sub-pixels or an extension direction of scanning lines described below. In addition, the column direction Y is a length direction of the sub-pixels or an extension direction of data lines described below.

As shown in FIG. 2, a liquid crystal device 1 includes a liquid crystal panel 2 and an illuminating device 3. An arrow A indicates an observation side and the illuminating device 3 is disposed at a position opposite the observation side to serve as a backlight. The liquid crystal panel 2 includes an element substrate 4 and a color filter substrate 5 opposite each other. The substrates are bonded by a seal member 7 with a circular shape, that is, a frame shape when viewed in an arrow A direction (which is also called a normal line direction of the substrates). In the first embodiment, the color filter substrate 5 is disposed on the observation side and the element substrate 4 is disposed on the rear side.

A cell gap which is a predetermined gap (for example, about 5 μm) is formed between the element substrate 4 and the color filter substrate 5. In addition, liquid crystal molecules are sealed in an inner side of the cell gap so as to form a liquid crystal layer 6. The liquid crystal layer is formed of nematic liquid crystal molecules having positive dielectric anisotropy. The liquid crystal molecules having the positive dielectric anisotropy have a property that a direction of a major axis thereof can become aligned parallel to a direction of an electric field.

The element substrate 4 includes a first substrate 11 made of a material such as a quartz glass or a plastic having a light-transmitting property. The first substrate 11 is formed in a longitudinal rectangular shape, as shown in FIG. 1, in the column direction Y when viewed in the normal line direction of the substrates. The first substrate 11 may have a square shape. As shown in FIG. 2, a first polarizing plate 12 is disposed on the outside of the first substrate 11. If necessary, a phase difference film may be disposed between the first polarizing plate 12 and the first substrate 11.

TFD elements 13, which are a two-terminal switching element, segment lines 14 electrically connected to the TFD elements 13 as signal lines, pixel electrodes 15 which are a first electrode and have an island shape are disposed on the inner side (side of the liquid crystal layer) of the first substrate 11. Each of the TFD elements 13 has a configuration in which two TFD elements are connected in series with reverse polarity, a so-called back-to-back configuration (which is described in detail below). The segment lines 14 made of Cr or Cr alloy are formed by, for example, a photo-etching process. A plurality of the segment lines 14 are formed. As shown in FIG. 1, each of the segment lines 14 has a slim line shape extending in the column direction Y and the plurality of segment lines 14 are formed so as to be parallel to each other at a predetermined interval in the row direction X. The segment lines 14 transmit a data signal as one signal for driving, for example, the liquid crystal molecules. A plurality of the TFD elements 13 connected to one segment line 14 are disposed along the segment line 14 at an interval.

As shown in FIG. 2, the pixel electrodes 15 made of metallic oxide such as indium tin oxide (ITO) or indium zinc oxide (IZO) having a light-transmitting property are subjected to, for example, a photo-etching process. A plurality of the pixel electrodes 15 are formed. As shown in FIG. 1, the pixel electrodes 15 have a rectangular island shape in the column direction Y when viewed from the normal line direction of the substrates. In addition, the plurality of pixel electrodes 15 are arranged in the row direction X and the column direction Y (in a so-called dot matrix pattern).

As shown in FIG. 2, a plurality of wiring lines 17, which are common lines, are disposed on both sides of the first substrate 11. The wiring lines 17 are extending wiring lines. The wiring lines 17 are each formed by laminating an ITO wiring line, which is a second layer, on a Cr wiring line, which is a first layer. The wiring lines 17 are subjected to, for example, a photo-etching process. The wiring lines 17 transmit a scanning signal, which is another signal, for driving, for example, the liquid crystal molecules. In addition, the wiring lines 17 may be formed so as to have a single layer made of another conductive metal.

As shown in FIG. 1, the wiring lines 17 include portions 17a having different lengths with a line shape so as to extend in the column direction Y and portions 17b having different lengths with a line shape so as to extend in the row direction X. The wiring lines 17 will be described in detail below.

As shown in FIG. 2, the TFD elements 13, the segment lines 14, the pixel electrodes 15, and the wiring lines 17 are covered to form a dielectric film 16. The dielectric film 16 is made of a nitride film or an oxide film such as silicon nitride (SiNx) or silicon oxide ($SiO_2$) or an organic transparent resin. The nitride film and the oxide film are an inorganic film. As shown in FIG. 1, the dielectric film 16 subjected to a photo-etching process is formed in a rectangular shape so as to cover all the pixel electrodes 15.

As shown in FIG. 2, common electrodes 18, which are second electrodes, are formed on the dielectric film 16. The common electrodes 18 are disposed between the plurality of sub-pixels. The common electrodes 18 made of metallic oxide such as ITO or IZO having a light-transmitting property are subjected to, for example, the photo-etching process. As shown in FIG. 1, a plurality of the common electrodes 18 are formed so as to have a strip shape extending in the row direction X and formed parallel in the column direction Y at an interval. The plurality of common electrodes 18 are formed so as to alternately protrude one by one in right and left directions. Protruding ends of common electrodes 18 are electrically connected to the wiring lines 17. Connection between the common electrodes 18 and the wiring lines 17 will be described in detail below.

The plurality of pixel electrodes 15 formed into the island are arranged in the row direction X and in the column direction Y in lines, in the so-called dot matrix pattern. On the other hand, the strip-shaped common electrodes 18 extending in the row direction X overlap the plurality of the pixel electrodes 15 extending in the row direction X in plan view. The pixel electrodes 15 and the common electrodes 18 overlapping each other in plan view are shaped as dots, that is, the island-shaped areas are arranged in dot matrix pattern. Each of the island areas constitutes a sub-pixel P, which is a control unit for driving the liquid crystal molecules. A plurality of the sub-pixels P arranged in the dot matrix pattern constitutes a display area V.

In the common electrodes 18, a plurality of slits 27, which are gaps, and a plurality of line-shaped electrode portions 28 each formed between the slits 27 are formed in correspondence to each of the sub-pixels P in order to realize the FFS mode. The slits 27 and the line-shaped electrode portions 28 will be described in detail below.

In the first embodiment, when a color display is performed using three colors, for example, red (R), green (G), and blue (B), each of the three colors is assigned to one of the sub-pixels P, three sub-pixels P corresponding to R, G, and B form one display pixel, and the display pixels are formed in the dot matrix pattern to constitute the display area V. When another different color (for example, blue green) in addition to the three colors is added to perform four-color display, the four sub-pixels P constitute one display pixel. In addition, when black and white colors or two arbitrary colors are used to perform display, each of the sub-pixels P corresponds to one display pixel.

As shown in FIG. 2, a first alignment film 19 is disposed on the first substrate 11 by covering the common electrodes 18 and the dielectric film 16. In FIG. 1, the first alignment film 19 is omitted. In FIG. 2, the first alignment film 19 made of, for example, polyimide is formed in a predetermined shape by, for example, a printing process or a transfer process. A rubbing process is performed in the first alignment film 19 to align the liquid crystal molecules in the liquid crystal layer 6 in a desired direction.

Next, the color filter substrate 5 opposite the element substrate 4 includes a second substrate 22 made of a material such as a quartz glass and a plastic having a light-transmitting property. As indicated by a chain line in FIG. 1, the second substrate 22 is formed in a longitudinal shape in the column direction Y when viewed from the normal line direction of the substrates. In addition, the second substrate 22 may have a square shape. The length of the second substrate 22 in the column direction Y is shorter than that of the first substrate 11. In addition, one end side of the first substrate 11 protrudes on the outward side of the second substrate 22. Driving ICs 21 are mounted on the producing portion of the first substrate 11 by a chip on glass technique using an anisotropic conductive Film (ACF). The segment lines 14 and the wiring lines 17 disposed on the first substrate 11 are electrically connected to an output terminal of each of the driving ICs 21. For example, the driving ICs 21 supply a data signal to the segment lines 14 and a scanning signal to the wiring lines 17. In the first embodiment, three driving ICs 21 are provided and separate driving ICs 21 supply signals to the segment lines 14 and the wiring lines 17. Instead of the configuration, one driving IC 21 can supply signals to the segment lines 14 and the wiring lines 17.

Three ends of the first substrate 11 and the second substrate 12 other than the protruding end do not match in FIG. 1 in order to show this configuration. However, actually the three ends thereof almost overlap each other in plan view.

As shown in FIG. 2, a second polarizing plate 23 is disposed on the outer side of the second substrate 22. If necessary, a view correction film or a phase difference film may be disposed between the first polarizing plate 23 and the second substrate 22. Color films 24 forming color filters are disposed on the inner side (side of the liquid crystal layer) of the second substrate 22 and light-shielding films 25 are disposed in the periphery thereof. Parenthesized R, G, and B of the color films 24 indicate that the color films 24 have a property of transmitting each color of red (R), green (G), and blue (B). In the first embodiment, the color films 24 are formed in a strip shape. The different colors of R, G, and B are sequentially arranged in the row direction X and the same colors of R, G, and B are arranged in the column direction Y. However, the color films 24 may be arranged arbitrarily, for example, in a mosaic arrangement or a delta arrangement.

The color films 24 are made of, for example, a resin material formed by mixing a photosensitive resin with pigment or dyes and are formed in a predetermined pattern by, for example, a photolithography process. The light-shielding films 25 are made of a light-shielding resin material or a light-shielding metallic material or formed by stacking two or three different color films 24 having different colors.

An overcoat layer 29 is disposed on the color films 24 and the light-shielding films 25. The overcoat layer 29 is used to perform flattening of the color films 24 or to protect the liquid crystal layer 6. The overcoat layer 29 is made of, for example, an acrylic organic resin film or formed by printing an inorganic film such as a silicon oxide film. In addition, a second alignment film 30 is disposed on the overcoat layer 29. The second alignment layer 30 is made of, for example, polyimide and formed in a predetermined shape by the printing process or the transfer process. The rubbing process is performed on the second alignment film 30 to align the liquid crystal molecules in the liquid crystal layer 6 in a desired direction.

The direction of the rubbing process performed on the first alignment film 19 on the element substrate 4 is anti-parallel to that of the rubbing process performed on the second alignment film 30 on the color filter substrate. In addition, the liquid crystal layer 6 is aligned in a homogeneous direction by the alignment films subjected to the rubbing process. The homogeneous direction, as known, is almost parallel to an alignment at a pretilt angle.

Figure 3A:
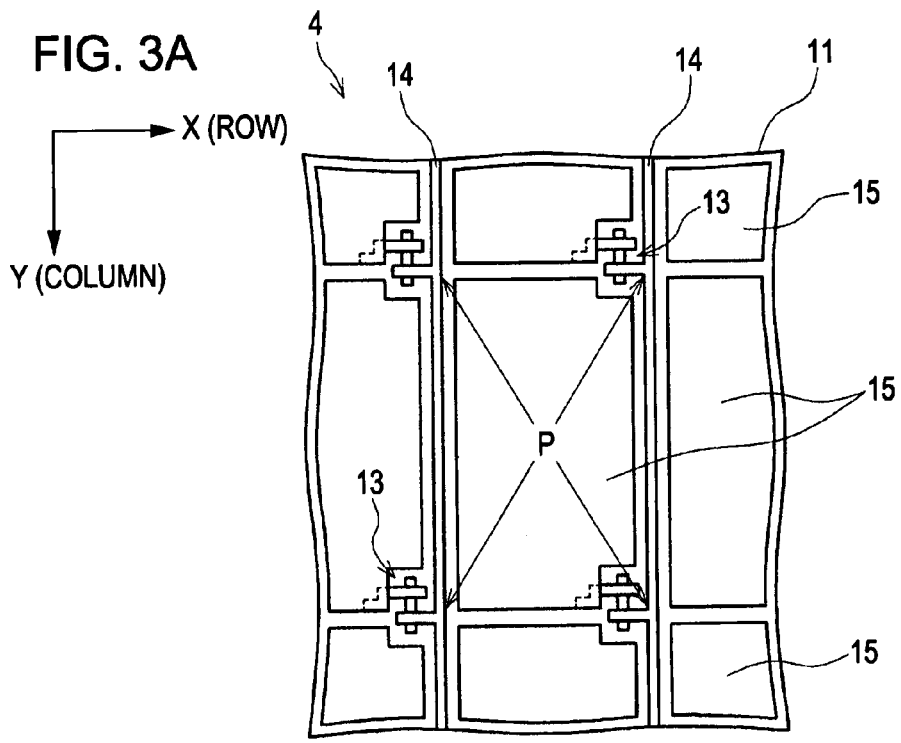
FIGS. 3A and 3B are top views illustrating sub-pixels and the vicinity thereof.
Figure 3B:
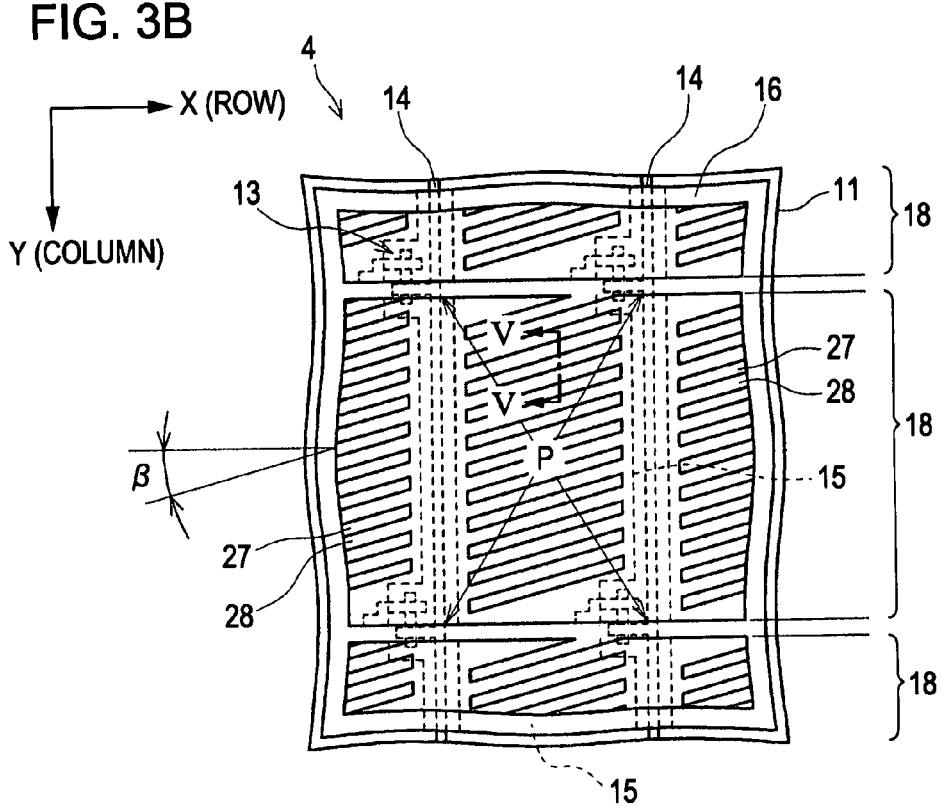
Figure 4A:
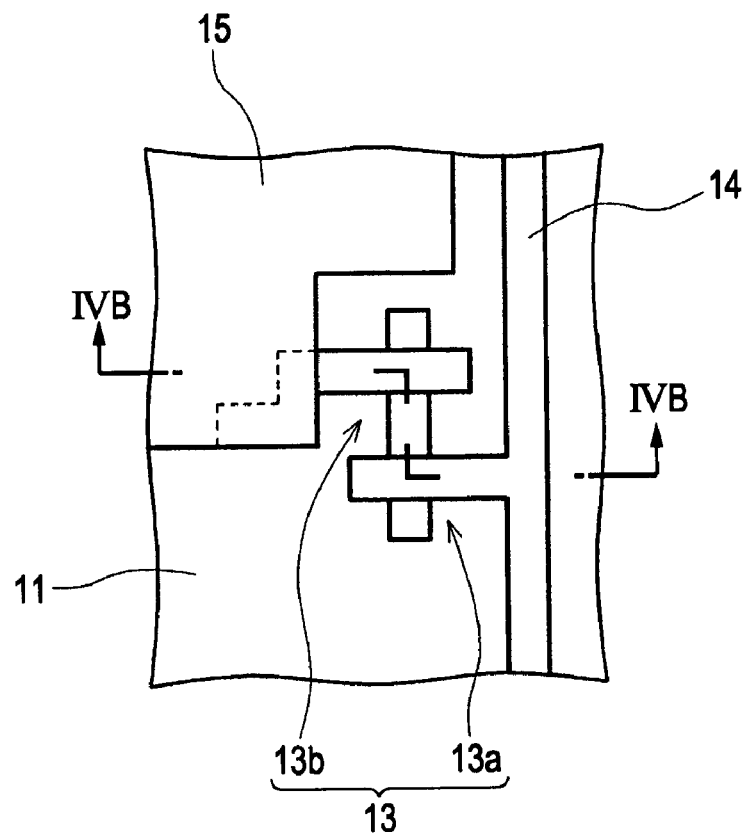
FIG. 4A is a top view illustrating a TFD element according to the first embodiment and FIG. 4B is a sectional view illustrating the TFT element according to the first embodiment.
Figure 4B:
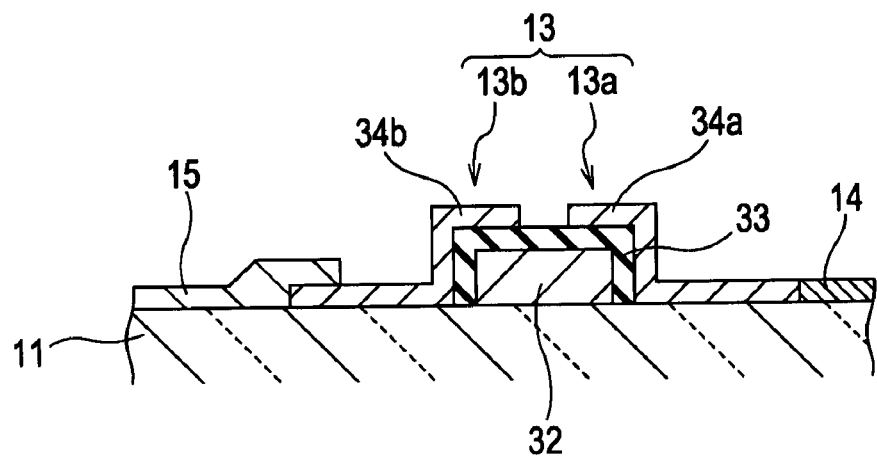

Next, one sub-pixel P and a configuration of the vicinity thereof will be described with reference to FIGS. 3 and 4. FIG. 3A is a top view illustrating a configuration before formation of the dielectric film 16 on the first substrate 11 on the element substrate 4. FIG. 3B is a top view illustrating a configuration when the strip-shaped common electrodes 18 are formed on the first substrate 11. FIG. 4A is an enlarged top view illustrating the TFD element shown in FIG. 3A. FIG. 4B is a sectional view illustrating the TFT element taken along the line ZD-ZD line shown in FIG. 4A.

As shown in FIG. 3A, the thin-film diode TFD elements 13, which are switching elements, are disposed in the corners of the sub-pixel P. As shown in FIG. 4A, the TFD elements 13 have a so-called back-to-back configuration in which two TFD constituents 13a and 13b are connected in series. Of course, the TFD elements 13 may not have the back-to-back configuration, but may be formed of one TFD constituent. As shown in FIG. 4B, the constituents 13a and 13b of each of the TFD elements are formed by stacking a first conductive film 32 on the first substrate 11, an insulating film 33 on the first conductive film 32, and second conductive films 34a and 34b on the insulating film 33.

The first conductive film 32 is made of, for example, tantalum (Ta) or a tantalum alloy and is formed into an island by, for example, a photo-etching process. The insulating film 33 is formed of tantalum oxide (TaOx) by, for example, an anodizing process. The second conductive films 34a and 34b are made of, for example, Cr and simultaneously subjected to the photo-etching process performed on the segment lines 14. The first TFD constituent 13a and the second TFD constituent 13b, which are diode elements with electrically reverse polarity, are connected in series to obtain a stable voltage-current property. The second conductive film 34a, which is an input terminal of the first TFD constituent 13a, integrally extends from each of the segment lines 14. The second conductive film 34b, which is an output terminal of the second TFD constituent 13b, is electrically connected to each of the pixel electrodes 15. Each of the pixel electrodes 15 is formed so as to be planar in the area of the sub-pixel P.

As shown in FIG. 3B, each of the common electrodes 18 with the strip shape overlapping each of the pixel electrodes 15 includes the plurality of slits 27, which are the gaps, and the plurality of line-shaped electrode portions 28 each formed between the slits 27. The plurality of slits 27 and the plurality of line-shaped electrode portions 28 are formed parallel to each other. An angle β formed by an extension direction (that is, extension direction of the line-shaped electrode portions 28) of the slits 27 and the width direction (the row direction X) of the sub-pixels P can be set in the range of, for example, $5° \leq β \leq 20°$.

Figure 5:
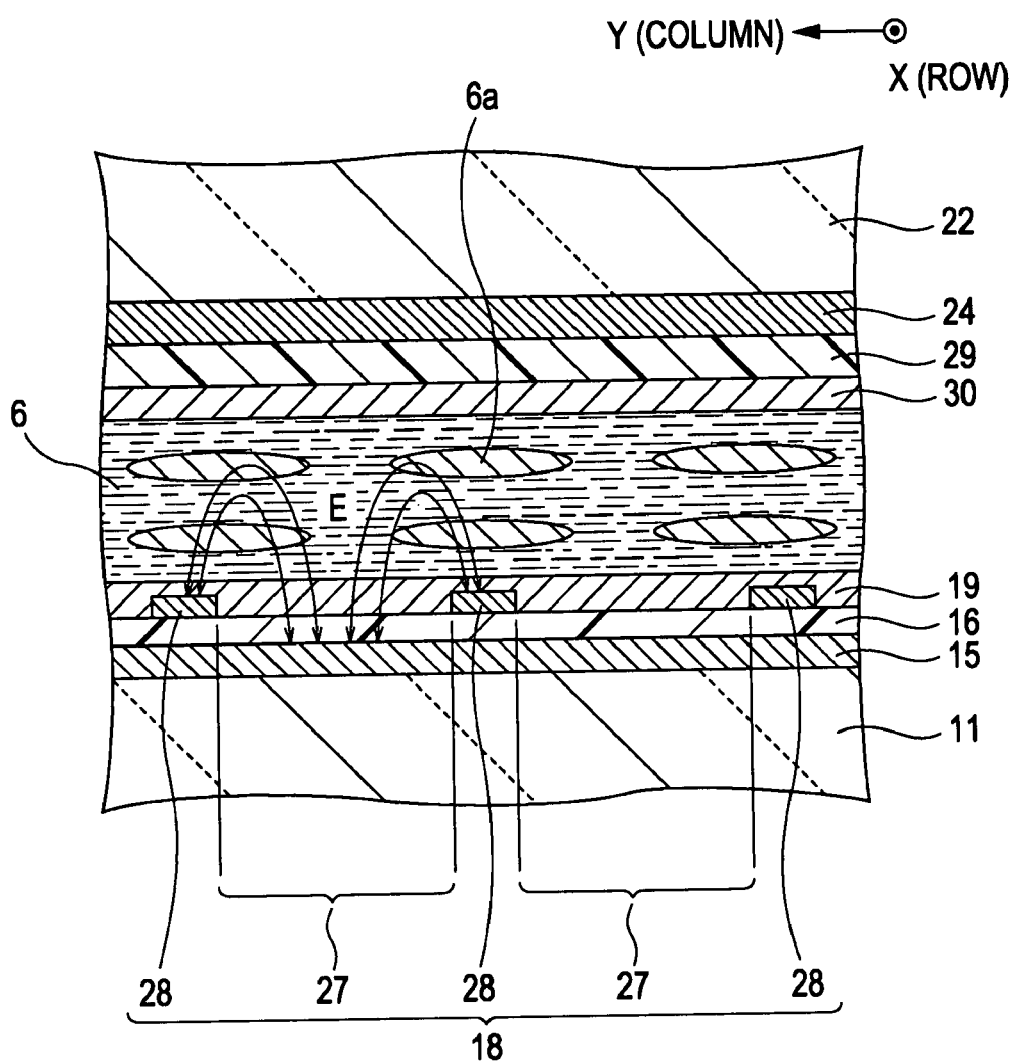
FIG. 5 is a sectional view taken along the line Ze shown in FIG. 3B.

FIG. 5 is a section view taken along the line Ze shown in FIG. 3B. As shown in FIG. 5, the pixel electrodes 15 are formed to be planar. Accordingly, the entire surfaces of the line-shaped electrode portions 28 of the common electrodes 18 overlap the pixel electrodes 15 in plan view. Electrostatic capacitors are formed in the dielectric film 16 in portions in which the line-shaped electrode portions 28 and the pixel electrodes 15 overlap each other in plan view. When a voltage higher than a threshold voltage is applied between the pixel electrodes 15 and the common electrodes 18, the TFD elements 13 are turned ON. In this way, an electric field E is formed between the pixel electrodes 15 and the line-shaped electrode portions 28 of the common electrodes 18. When the electric field E is generated, liquid crystal molecules 6a having positive dielectric anisotropy, which form the liquid crystal layer 6, align in the plane parallel to the substrate so that the major axis thereof is parallel to a direction of the electric field E. The movement of the liquid crystal molecules 6a induces polarized light passing through the liquid crystal layer 6 to be modulated. In the first embodiment, the alignment of the liquid crystal molecules 6a is controlled in the flat plane parallel to the substrate. Accordingly, it is possible to achieve a wider viewing angle and a higher-contrast display, compared with the TN mode or the like in which an alignment is controlled in a vertical direction of the substrate.

As the transverse electric mode, an in-plane switching (IPS) mode is known in addition to the FFS mode. In the case of the IPS mode, as shown in FIG. 5, the pixel electrodes 15 are not formed to be planar, but in the strip shape like the common electrodes 18 or in a frame-shape. In addition, without overlapping the line-shaped electrode portions 28 of the common electrodes 18 with the pixel electrodes 15 in plan view, wide gaps are configured to be formed between the line-shaped electrode portions 28 of the common electrodes 18 and the line-shaped electrode portions or frame-shaped electrode portions of the pixel electrodes 15 in plan view. With such a configuration, in the case of the IPS mode, a transverse electric field is generated between the pixel electrodes and the common electrodes. However, an electric field of sufficient magnitude cannot be generated in areas above the common electrodes. In order to avoid this problem, in the case of the FFS mode, the line-shaped electrode portions 28 of the common electrodes 18 overlap the pixel electrodes 15 in plan view. Accordingly, since an electric field of sufficient magnitude is generated in the area above the line-shaped electrode portions 28, the area can be used as the display area. As a result, according to the first embodiment, the FFS mode can achieve wider viewing angle, higher contrast display, and higher transmission than the IPS mode.

Next, a relation of an optical axis between the first polarizing plate 12 and the first alignment film 19 on the element substrate 4 and the second polarizing plate 23 and the second alignment film 30 on the color filter substrate 5 will be described with reference to FIGS. 6A and 6B. As shown in FIG. 6A, an arrow R1 indicates the rubbing direction of the first alignment film 19 (see FIG. 2) on the element substrate 4. The rubbing direction R1 is set parallel to the width direction (the row direction X) of the sub-pixels P.

An angle α formed by the extension direction (that is, the extension direction of the line-shaped electrode portions 28) of the slits 27 formed in the common electrodes 18 on the element substrate 4 and the rubbing direction R1 is arbitrarily set in the range of, for example, $5° \leq α \leq 20°$. In the foregoing description in FIG. 3B, the angle β formed by the extension direction (that is, the extension direction of the line-shaped electrode portions 28) of the slits 27 and the width direction (the row direction X) of the sub-pixels P can be set in the range of, for example, $5° \leq β \leq 20°$. However, if the angle β formed by the width direction (the row direction X) of the sub-pixels P is equal to the angle α formed by the rubbing direction R1 relative to the slits 27, the rubbing direction R1 is equal to the width direction of the sub-pixels P. If $α \neq β$ is satisfied, the rubbing direction R1 deviates from the width direction of the sub-pixels P.

When the angle α formed by the rubbing direction R1 relative to the slits 27 is set in the range of $5° \leq α \leq 20°$, variation in the alignment of the liquid crystal molecules can be stabilized in the FFS mode at the time an ON-voltage is applied. Moreover, the threshold voltage caused by the variation in the alignment can be reduced.

Figure 7:
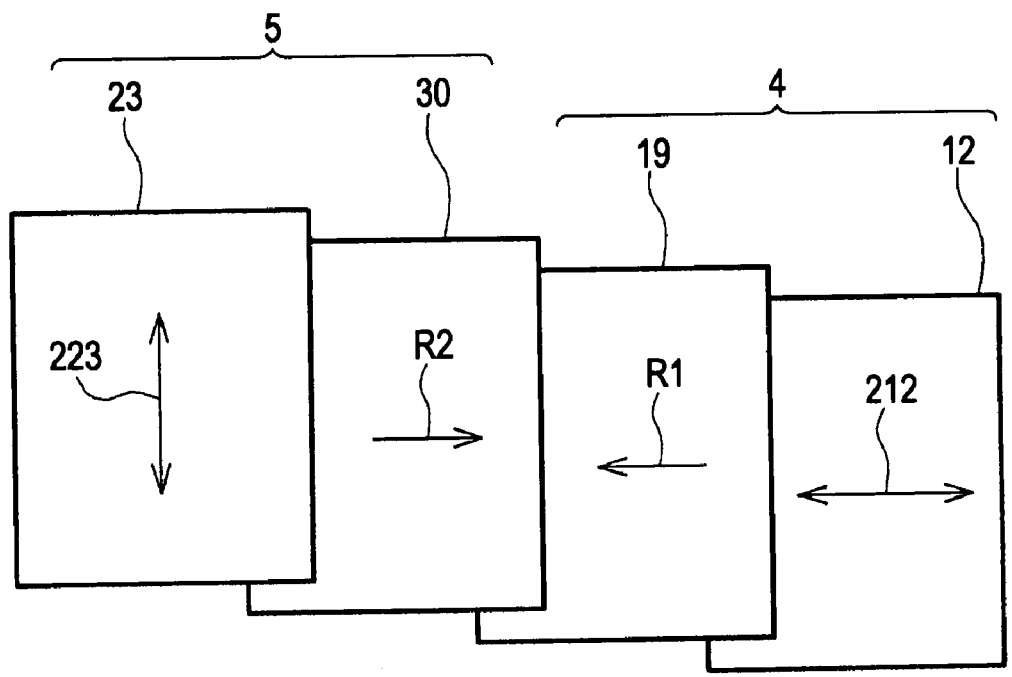
FIG. 7 is a diagram illustrating the relation of an optical axis between a polarizing transmission axis and the rubbing direction.

FIG. 7 is a diagram illustrating the relation between a transmission axis of the polarizing plate and the rubbing direction. As shown in FIG. 7, the direction of the rubbing performed on the second alignment film 30 (see FIG. 2) on the color filter substrate 5 opposite the element substrate 4 is anti-parallel to the rubbing direction R1 on the side of the element substrate 4, which is indicated by a reference sign R2. A polarizing transmission axis 212 on the side of the element substrate 4 is parallel to the rubbing direction R1 on the side of the element substrate 4. In addition, a polarizing transmission axis 223 of the second polarizing plate 23 is perpendicular to the polarizing transmission axis on the side of the element substrate 4. With the above-described relation of the optical axes, stable switching between white display and black display by use of the FFS mode can be realized.

FIG. 6A shows the black display state when an OFF-voltage, which is lower than the threshold voltage of the TFD elements, is applied between the pixel electrodes 15 and the common electrodes 18. When the OFF-voltage is applied, the liquid crystal molecules 6a are in an initial alignment state in which the major direction thereof is parallel to the rubbing direction R1. When the ON-voltage which is higher than the threshold voltage of the TFD elements is applied between the pixel electrodes 15 and the common electrodes 18 and white display is realized, an electric field, a so-called transverse electric field, parallel to the substrate in a direction (that is, the extension direction of the line-shaped electrode portions 28) perpendicular to the extension direction of the slits 27 in FIG. 6B is generated. In the first embodiment, since the line-shaped electrode portions 28 of the common electrodes 18 overlap the pixel electrodes 15 in plan view, an electric field (so-called inclined transverse electric field or parabolic electric field) perpendicular to the substrate is generated in boundary portions between the slits 27 and the line-shaped electrode portions 28. The area in which the electric field in a direction perpendicular to the substrate is generated is called a fringe field. The liquid crystal molecules 6a having the positive dielectric anisotropy rotate in the plane parallel to the substrate so that the major axis thereof becomes aligned in the direction of the electric field.

In the liquid crystal device 1 according to the first embodiment described above, planar light supplied from the illuminating device 3 to the liquid crystal panel 2 shown in FIG. 2 is supplied to the liquid crystal layer 6 in a state where the light is polarized by the first polarizing plate 12. In addition, by controlling the voltage applied to the liquid crystal layer 6 shown in FIG. 2 in every sub-pixel P by use of the scanning signal and the data signal from the driving ICs 21 shown in FIG. 1, the alignment of the liquid crystal molecules 6a (see FIGS. 6A and 6B) is controlled in every sub-pixel P and the light from the illuminating device 3 through the liquid crystal layer 6 is modulated in every sub-pixel P. The light modulated in such a manner is supplied to the second polarizing plate 23. In addition the light is not absorbed in the second polarizing plate 23 and images are displayed in the display area V shown in FIG. 1 by the polarized light transmitted through the polarizing plate.

The liquid crystal device 1 with the above-described configuration according to the first embodiment is a transverse electric field type liquid crystal device in which the pixel electrodes 15 and the common electrodes 18 are disposed on the element substrate 4, as shown in FIG. 2. Accordingly, the liquid crystal molecules are aligned in the plane parallel to the substrate. Therefore, the liquid crystal device according to the embodiment can realize the wider viewing angle and the higher-contrast display, compared with the vertical electric field type liquid crystal device which is a popular type of the TN mode.

As shown in FIGS. 3A and 3B, the liquid crystal device 1 according to the first embodiment is a FFS mode liquid crystal device in which the line-shaped electrode portions 28 of the common electrodes 18 overlap the pixel electrodes 15 in plan view. Accordingly, it is possible to form the sufficient electric field even in the area above the line-shaped electrode portions 28. Therefore, the liquid crystal device according to the embodiment can realize the wider viewing angle and the higher-transmission display, compared with the IPS mode in which the sufficient electric field cannot be formed in the area above the line-shaped electrode portions 28.

The liquid crystal device 1 according to the first embodiment can realize the FFS mode using the TFD elements 13 as the switching elements. In the past, there was known a liquid crystal device using a three-terminal switching element, which is a TFT element. However, since the liquid crystal device using the three-terminal switching element has a complicated configuration and many processes are necessary to manufacture the liquid crystal device, manufacturing cost necessarily increases. However, the manufacture of the liquid crystal device 1 using the TFD element as the switching element according to the first embodiment can be simplified at low cost.

In this way, even when the liquid crystal device 1 according to the first embodiment can be manufactured at low cost, the FFS mode (that is, which controls the alignment of the liquid crystal molecules by use of the electric field parallel to the substrate, the so-called transverse electric field) is used as the switching mode. As a result, it is possible to achieve the wider viewing angle and the higher-contrast display, compared with the case of the vertical electric field which is a popular type of the TN mode.

Next, the configurations of the dielectric film 16, the wiring lines 17, and the common electrodes 18 on the first substrate 11 shown in FIG. 1 will be described in detail.

First, the configuration of the wiring lines 17 will be described. Each of the wiring lines 17 includes a line-shaped portion 17a, which is a first portion, extending in a line shape in a direction (the column direction Y) intersecting each of the common electrodes 18 in plan view and a planar portion 17b, which is a second portion, being curved almost at a right angle from the line-shaped portion 17a and extending in a direction parallel to each of the common electrodes 18 in plan view. The end of the line-shaped portion 17a on the outer side than the seal member 7 is electrically connected to an output terminal (not shown) of the driving IC 21 by a bonding material such as ACF. The line-shaped portion 17a is formed from the driving IC 21 to each of the common electrode 18. In addition, the line-shaped portion 17a is arranged on the outer area (so-called frame area) of the display area V. The line-shaped portion 17a is a drawn wiring line for connecting the driving IC 21 to each of the common electrodes 18.

On the other hand, the planar portions 17b extend toward a side opposite the display area V in the row direction X with the line-shaped portion 17 interposed therebetween. That is, the planar portions 17b are a portion extending toward the end side 11b or 11c of the substrate 11 from the line-shaped portions 17a. Each of the planar portions 17b is arranged at a position overlapping each of the common electrodes 18 in plan view. The planar portions 17b are electrically connected to the common electrodes. One or both of the line-shaped portion 17a and the planar portion 17b made of Cr, a Cr alloy, aluminum (Al), an Al alloy, or another conductive metallic material can be formed in a single layer. Moreover, ITO, IZO, or another metallic oxide may be stacked thereon.

In the first embodiment, the planar portion 17b of the wiring line 17 is thicker than the line-shaped portion 17a. That is, a width W1 of the planar portion 17b in a direction (the column direction Y) perpendicular to an extension direction of the planar portion 17b is larger than a width W0 of the line-shaped portion 17a in a direction (the row direction X) perpendicular to an extension direction of the line-shaped portion 17a (W0<W1). The planar portions 17b are electrically connected to the common electrodes 18 and the width W1 of the planar portions 17b is made larger so as to increase the contact area with each of the common electrodes 18. As a result, it is possible to reliably connect the wiring lines 17 to the common electrodes 18. On the other hand, the line-shaped portions 17a are lines drawn to the outer side of the display area V. The width V0 of the line-shaped portions 17a is made narrower so as to reduce the area of the outer side. Accordingly, the size of the liquid crystal device can be reduced by decreasing the size of a liquid crystal panel 2. Moreover, it is possible to increase the size of the liquid crystal device by making the display area V larger.

Next, mutual configurations of the dielectric film 16, the wiring lines 17, and the common electrodes 18 will be described. As shown in FIG. 2, the dielectric film 16 is disposed on the plurality of wiring lines 17. That is, the wiring lines 17 are covered with the dielectric film 16. The dielectric film 16 disposed between the pixel electrodes 15 and the common electrodes 18 is a film for electrically insulating the pixel electrodes 15 from the common electrodes 18. The dielectric film 16 extends until the wiring lines 17 so as to cover the wiring lines 17. Since the dielectric film 16 extends until the midway of the planar portions 17b in the row direction X, there is an area where the dielectric film 16 does not exist. Accordingly, parts of the planar portions 17 are exposed from the end side of the dielectric film 16 in the area where the dielectric film 16 does not exist.

As shown in FIG. 1, the dielectric film 16 is disposed in the inner side of the seal member 7. In addition, parts of the line-shaped portions 17a in which the seal member 7 extends on the outside (portion extending to the protruding end of the first substrate 11) are exposed from the dielectric film 16.

In the dielectric field 16, the common electrodes 18 formed in the strip shape in the row direction X extend on the outer side from the end side of the dielectric film 16 in a portion in which the common electrodes 18 overlap the planar portions 17b in plan view. That is, the common electrodes 18 are exposed from the dielectric film 16 toward the areas where the dielectric film 16 does not exist. As shown in FIG. 2, in the area where the dielectric film 16 does not exist, the extension portions of the common electrodes 18 come in contact with the planar portions 17b of the wiring lines 17 exposed from the end side of the dielectric film 16. In this way, the common electrodes 18 and the wiring lines 17 are electrically connected to each other.

In the FFS mode liquid crystal device using the TFD elements, as shown in FIG. 1, the plurality of common electrodes 18 and the plurality of wiring lines 17 electrically connected to the common electrodes 18 are disposed in the same substrate 11. In the configuration, there are portions (for example, portions indicated by diagonal lines) in which the line-shaped portions 17a extending in the column direction Y and the common electrodes 18 extending in the row direction X are overlapped with each other. The portions in which the plurality of wiring lines 17 and the plurality of common electrodes 18 which are not electrically connected to each other are intersected with each other. In addition, it is necessary to electrically insulate the portions from each other.

In the first embodiment, as shown in FIG. 2, the wiring lines 17 is configured to be covered with the dielectric film 16 which electrically insulates the pixel electrodes 15 from the common electrodes 18. Accordingly, since the wiring lines 17 and the common electrodes 18 which are different from those connected to the wiring lines 17 can be electrically insulated from each other, it is not necessary to provide a structure for insulating the wiring lines 17. As a result, it is possible to easily form the configuration for electrically insulating the wiring lines 17 from the common electrodes 18.

Parts of the planar portions 17b of the wiring lines 17 are configured to be exposed from the end side of the dielectric film 16 and the common electrodes 18 come in contact with the exposed portion. In this way, since the planar portions 17b and the common electrodes 18 are reliably connected to each other on the outer side of the dielectric film 16, it is not necessary to interpose a dielectric film therebetween and the wiring lines 17 and the common electrodes 18 can be electrically connected to each other.

Second Embodiment of Liquid Crystal Device

Figure 8:
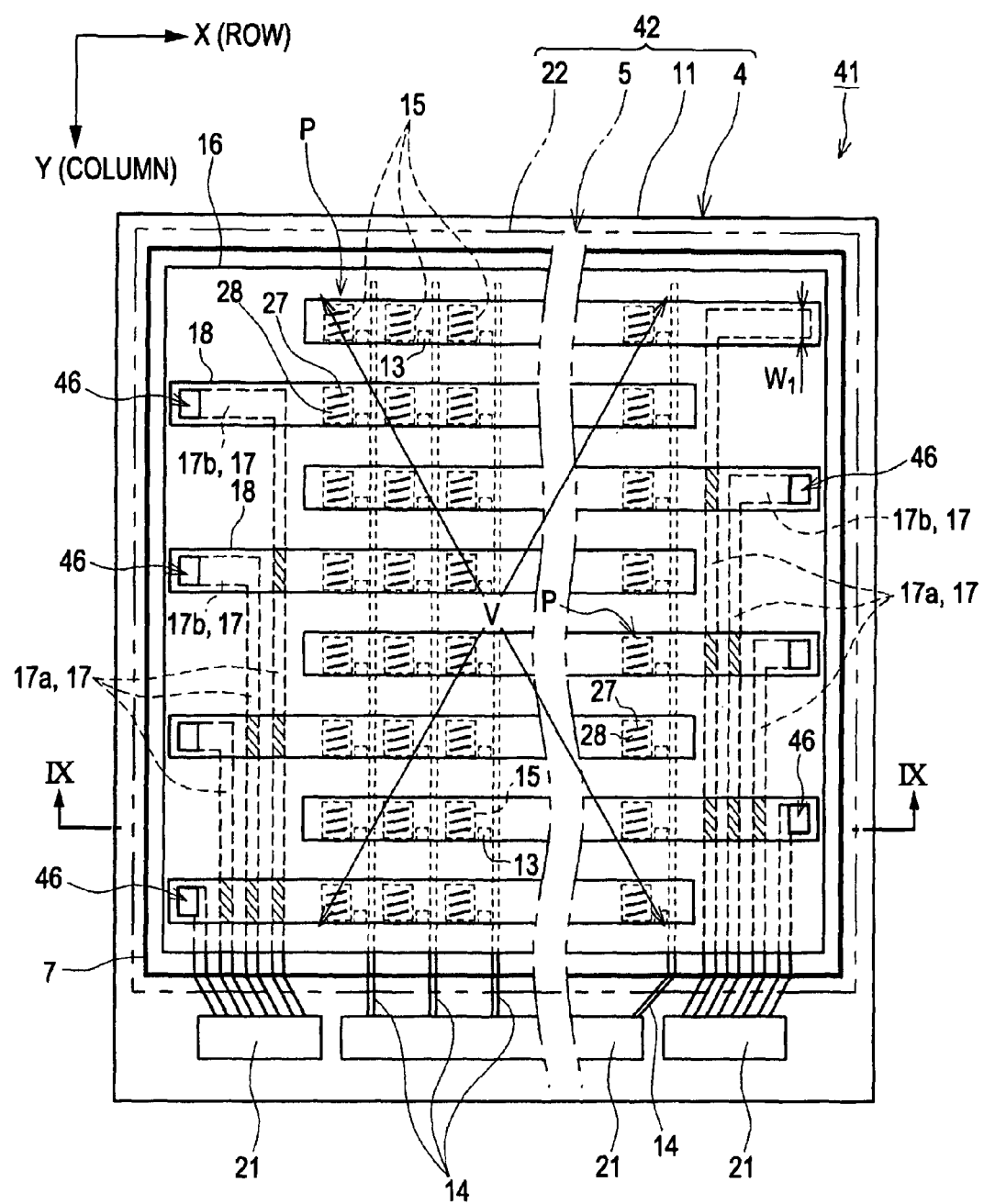
FIG. 8 is a top view illustrating a liquid crystal device according to a second embodiment of the invention.
Figure 9:
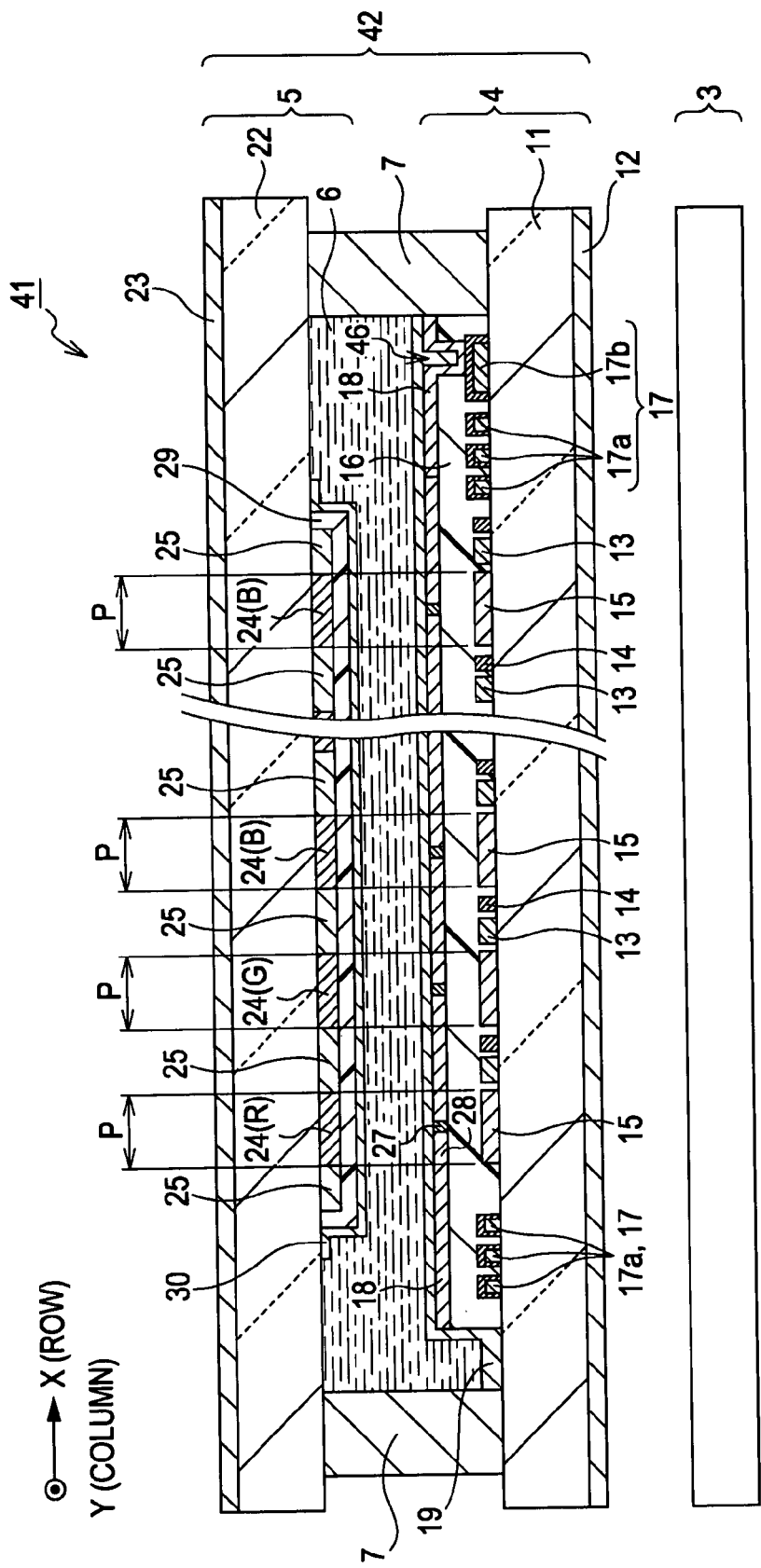
FIG. 9 is a sectional view illustrating the liquid crystal device taken along the line ZI-ZI shown in FIG. 8.

Next, a liquid crystal device according to a second embodiment of the invention will be described. FIG. 8 is a top view illustrating the liquid crystal device according to the second embodiment of the invention when viewed from an observation side of the liquid crystal device. FIG. 9 is a sectional view illustrating the liquid crystal device taken along the line ZI-ZI shown in FIG. 8. In FIGS. 8 and 9, the reference numerals are given to the same elements as those of the liquid crystal device 1 shown in FIGS. 1 and 2 and the description will be omitted.

The liquid crystal device 1 according to the first embodiment shown in FIG. 1 is configured so that on the first substrate 11 which constitutes the element substrate 4, the wiring lines 17 are covered with the dielectric film 16, the parts of the wiring lines 17 are exposed from the end side of the dielectric film 16, the wiring lines 17 and the strip-shaped common electrodes 18, which are the second electrodes, are electrically connected in the exposed portion. In the second embodiment, the connection configuration of the common electrodes and the common lines will be modified.

As shown in FIG. 8, all pixel electrodes 15 and all wiring lines 17 are covered with a dielectric film 16 like the first embodiment shown in FIG. 1. The second embodiment shown in FIG. 8 is different from the first embodiment shown in FIG. 1 in that the parts of the planar portions 17b are exposed from the end side of the dielectric film 16 in FIG. 1, but all planar portions 17b are covered with the dielectric film 16 in FIG. 8.

In the portions in which the dielectric film 16 overlaps the planar portions 17b in plan view, contact holes 46 (area where the dielectric film 16 does not exist) are formed. As shown in FIG. 9, the contact holes 46 are holes formed through the dielectric film 16 in the thickness direction (upward and downward directions) thereof. Accordingly, the surfaces of the planar portions 17b are exposed from the dielectric film 16 through the contact holes 46. In addition, the contact holes 46 have a rectangular shape in plan view, but may have a circular shape instead.

In this way, common electrodes 18 are disposed on the dielectric film 16 through which the contact holes 46 are formed. The common electrodes 18 are formed in a strip shape in the row direction X and the end of each of the common electrodes 18 overlaps the each of the planar portions 17b in plan view. As shown in FIG. 9, the common electrodes 18 are also disposed on the inner side of the contact holes 46 and come in contact with the planar portions 17b of the wiring lines 17 in the lower portions of the contact holes 46 so as to be electrically connected to the wiring lines 17.

In the second embodiment, as shown in FIG. 8, the wiring lines 17 are covered with the dielectric film 16 for electrically insulating the pixel electrodes 15 from the common electrodes 18. Accordingly, by using the dielectric film 16, the wiring lines 17 and the common electrodes 18, which are different from those connected to the wiring lines 17, can be electrically insulated. Specifically, the dielectric film 16 can electrically insulate the portion (diagonal portions in the drawing) in which the line-shaped portions 17a of the wiring lines 17 and the common electrodes 18 overlap each other. Accordingly, it is not necessary to provide a configuration for insulating the wiring lines 17 from the common electrodes 18. As a result, it is possible to easily form the configuration for electrically insulating the wiring lines 17 from the common electrodes 18.

The contact holes 46 are formed on the portions in which the planar portions 17b of the wiring lines 17 overlap the dielectric film 16 in plan view. In addition, the common electrodes 18 and the planar portions 17b of the wiring lines 17 are electrically connected to each other through the contact holes 46. In this way, it is possible to electrically insulate the portions (diagonal lines in the drawing) in which the line-shaped portions 17a of the wiring lines 17 overlap the common electrodes 18 in plan view and to bring the planar portions 17b in contact with the common electrodes 18 through the contact holes 46. Accordingly, it is possible to electrically connect the wiring lines 17 to the common electrodes 18 more reliably.

The contact holes for electrical connection in the liquid crystal device are generally formed so as to have a narrower width than a width of the planar portions. However, in the second embodiment, the width of the contact holes 46 is substantially equal to a width W1 in a direction (the column direction Y) perpendicular to the extension direction of the planar portions 17*b* and is made larger so as to be close to the width W1 as much as possible. In addition, the width of the contact holes 46 may be completely equal to the width W1 of the planar portions 17*b* and may be even larger than the width W1 in some cases. In any case, since the areas where the common electrodes 18 and the planar portions 17*b* come in contact with each other can be made larger, the connection therebetween can become better. Moreover, the width of the contact holes 46 may be narrower than the width W1 of the planar portions 17*b* without danger of deteriorating connection between the common electrodes 18 and the planar portions 17*b*.

Third Embodiment of Liquid Crystal Device

In the first and second embodiments, as the switching element, the two-terminal element has been used. However, in a third embodiment, as the switching element, a thin-film transistor (three-terminal element) will be used. In addition, a general configuration according to the third embodiment is the same as that according to the first embodiment, and thus the same reference numerals are given to common elements. When current in the thin-film transistor flows in an opposite direction, a source and drain are changed. However, for convenient description, the side connected to the pixel electrode refers to the drain and the side connected to a data line refers to the source.

Overall Configuration

Figure 10:
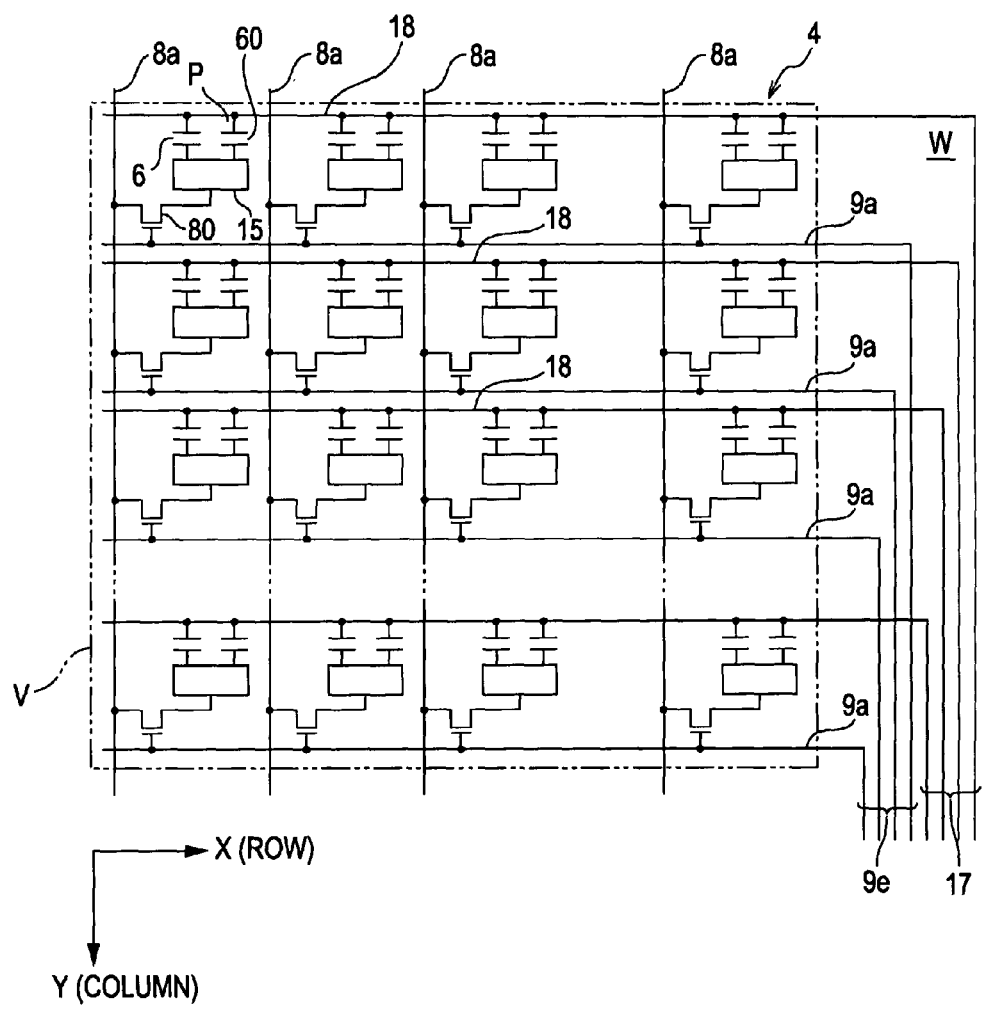
FIG. 10 shows a circuit illustrating an electrical configuration of a display area of an element substrate used in a liquid crystal device according to a third embodiment of the invention.

FIG. 10 shows a circuit illustrating an electrical configuration of a display area V of an element substrate 4 used in a liquid crystal device 1 according to the invention. As shown in FIG. 10, in the display area V of the liquid crystal device 1, a plurality of sub-pixels P are formed in a matrix pattern. Each of the plurality of sub-pixel P includes a pixel electrode 15, which is a first electrode, and a thin-film transistor 80 for controlling the pixel electrode 15. In addition, data lines 8*a* for sequentially supplying a data signal (image signal) are electrically connected to sources of the thin-film transistors 80. The scanning lines 9*a* are electrically connected to gates of the thin-film transistors 80. The pixel electrodes 15, which are connected to the drains of the thin-film transistors 80, apply the data signal supplied from the data lines 8*a* to each of the sub-pixels P at a predetermined timing by turning the thin-film transistors 80 ON for some time. The pixel signal with a predetermined level applied to a liquid crystal layer 6 through the pixel electrodes 15 in this way holds for some time between the common electrodes 18, which are a second electrode, formed on the element substrate 4. In this case, holding capacitors 60 are formed between the pixel electrodes 15 and the common electrodes 18. In addition, a voltage of the pixel electrodes 15 holds for, for example, the time longer by three digits than the time for which a source voltage is applied. Accordingly, it is possible to realize the liquid crystal device 1 capable of improving a holding property of charges and achieving a higher contrast display.

Detailed Configuration of Pixel

Figure 11:
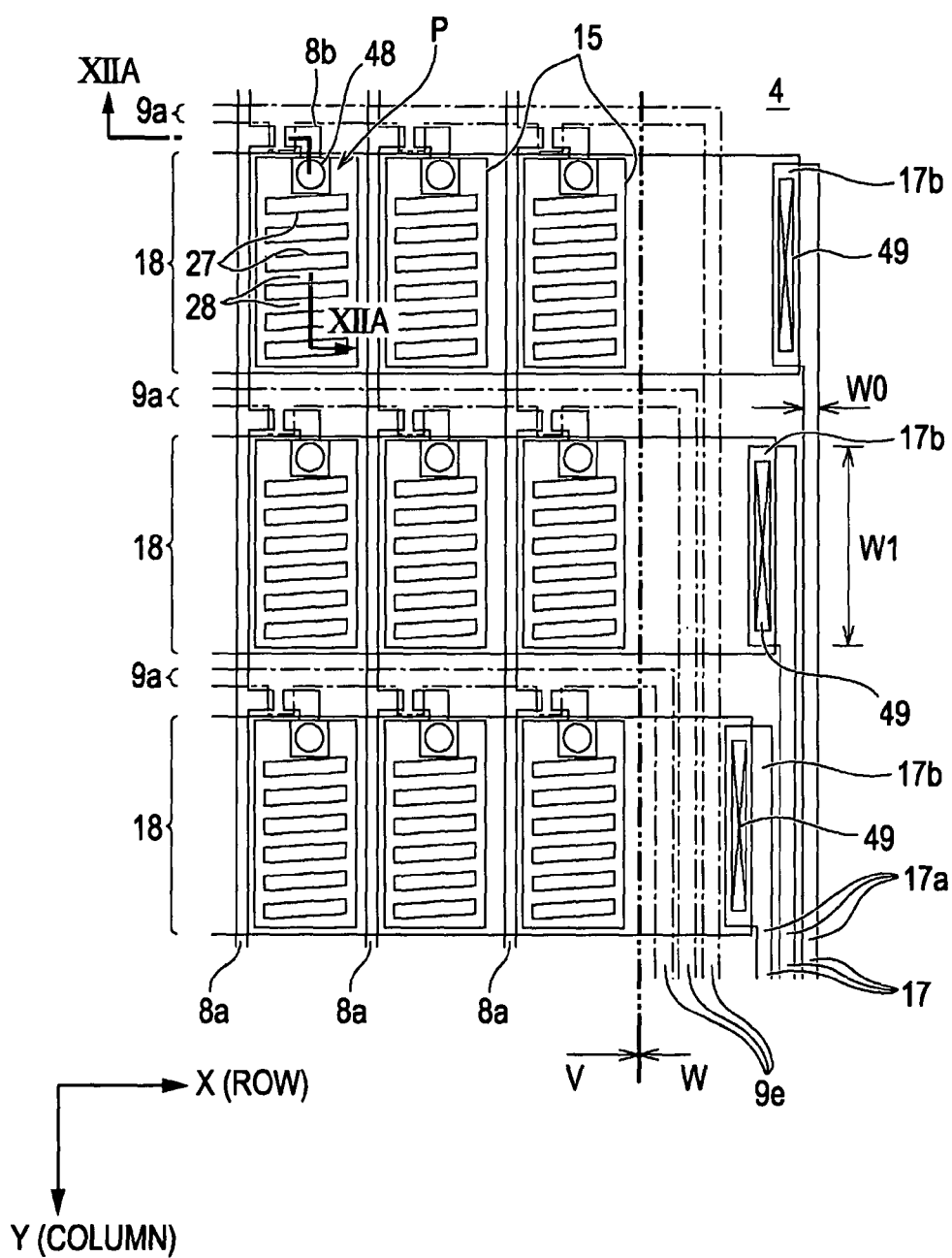
FIG. 11 is top view illustrating the plurality of sub-pixels on the element substrate used in the liquid crystal device according to the third embodiment.
Figure 12A:
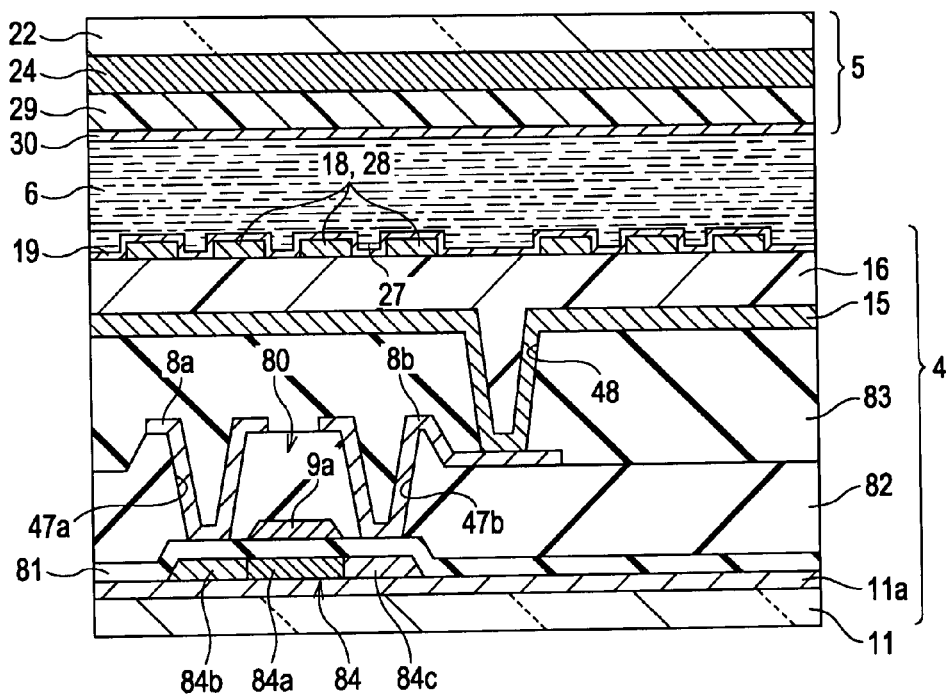
FIGS. 12A and 12B are sectional views illustrating one sub-pixel of the liquid crystal device according to the third embodiment and a configuration of connection portions between the common electrodes and the wiring lines.
Figure 12B:
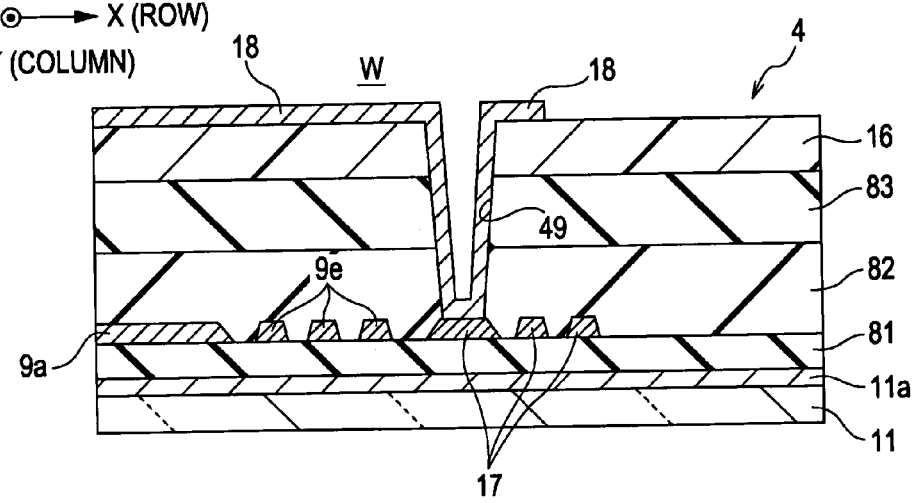

FIG. 11 is top view illustrating the plurality of sub-pixels P on the element substrate used in the liquid crystal device 1 according to the third embodiment. FIGS. 12A and 12B are sectional views illustrating one sub-pixel of the liquid crystal device according to the third embodiment and a configuration of connection portions between the common electrodes and the wiring lines. FIG. 12A is the sectional view illustrating the sub-pixel taken along the line A-A' shown in FIG. 11. FIG. 12B is the section view illustrating the sub-pixel taken along the line B-B' shown in FIG. 11.

As shown in FIGS. 11, 12A, and 12B, a plurality of the transparent pixel electrodes 15 (first electrode) formed of an ITO film are disposed in each of the sub-pixels P in the matrix pattern. In addition, the data line 8*a* and the scanning line 9*a* are formed along the longitudinal and transverse boundary areas of the pixel electrodes 15. The pixel electrodes 15 are each a planar electrode with no gap.

The strip-shaped common electrodes 18 formed of the ITO film so as to extend in an extension direction of the scanning line 9*a* are disposed on the display area V of the element substrate 4. Moreover, a plurality of the common electrodes 18 are arranged parallel in a direction in which the data line 8*a* extends. A plurality of slits 27 (gaps) are formed in the common electrodes 18 and line-shaped electrode portions 28 are formed between the plurality of slits 27. In the third embodiment, the plurality of slits 27 and the line-shaped electrode portions 28 extend so as to be inclined about the extension direction of the scanning lines 9*a*. Moreover, the plurality of slits 27 and the line-shaped electrode portions 28 extend so as to be parallel to each other. An angle β formed by the extension direction (the extension direction of the line-shaped electrode portions 28) of the slits 27 and the width direction (the row direction X) of the sub-pixel P can be set to be in the range of, for example, $5° \leq \beta \leq 20°$. A direction of rubbing performed on a second alignment film 30 on a color filter substrate 5 opposite the element substrate 4 is anti-parallel to a direction of the rubbing performed on a first alignment film 19 on the element substrate 4. As not shown, a polarizing transmission axis of a first polarizing plate on the element substrate 4 is parallel to the direction of the rubbing performed on the first alignment film 19 on the element substrate 4. Moreover, a polarizing transmission axis of the second polarizing plate on the color filter substrate 5 is perpendicular to the polarizing transmission axis of the first polarizing plate on the element substrate 4.

A base substrate of the element substrate 4 shown in FIG. 12A is configured to be a first substrate 11 formed of a quartz substrate, a heat-resistance glass substrate, or the like. In addition, a base substrate of the color filter substrate 5 is configured to be a second substrate 22 formed of the quartz substrate, the heat-resistance glass substrate, or the like. In the third embodiment, one of the first substrate 11 and the second substrate 22 is the glass substrate. In the color filter substrate 5, a color filter 24 and an overcoat layer 29 are formed in the second substrate 22.

In the element substrate 4, a ground protection film 11*a* formed of a silicon oxide film or the like are formed on the surface of the first substrate 11 and the thin-film transistor 80 with a top gate structure is formed at a position overlapping each of the pixel electrodes 15 on the side of the surface thereof. As shown in FIGS. 11 and 12A, the thin-film transistor 80 has a structure with an island-shaped semiconductor film 84 constituted by a channel region 84*a*, a source region 84*b*, and a drain region 84*c* and can be formed so as to have a lightly doped drain structure with regions with low concentration on both sides of the channel region 84*a*. In the third embodiment, the semiconductor film 84 is a multi-crystal polysilicon film subjected to a laser annealing process or a lamp annealing process after forming an amorphous silicon film.

A gate insulating film 81 formed of a silicon oxide film, a silicon nitride film, or a film formed by stacking them is disposed on the upper surface of the semiconductor film 84. A gate electrode, a part of the scanning line 9*a* is stacked so as to be opposed to the channel region 84*a*. In the third embodiment, the gate electrodes may have twin-gate structure formed at two positions in a channel direction.

An interlayer insulating film 82 formed of the silicon oxide film, the silicon nitride film, or the film formed by stacking them is disposed on the upper surface of the gate electrode (the scanning line 9a). The data line 8a is formed on the surface of the interlayer insulating film 82 and electrically connected to the source region 84b through the contact hole 47a formed through the interlayer insulating film 82. In addition, drain electrodes 8b are formed on the surface of the interlayer insulating film 82 and is a conductive film simultaneously formed with the data line 8a.

An interlayer insulating film 83 are formed on the upper side of the data line 8a and the drain electrodes 8b. In the third embodiment, the interlayer film 83 is formed as a flattened film formed of a thick photosensitive resin with the thickness in the range of 1.5 to 2.0 μm.

The pixel electrodes 15 formed of the ITO film are formed into the island on the surface of the interlayer insulating film 83. The pixel electrodes 15 are electrically connected to the drain electrodes 8b through contact holes 48 formed through the interlayer insulating film 83. The drain electrodes 8b are electrically connected to the drain region 84c through contact holes 47b formed through the interlayer insulating film 82 and the gate insulating film 81.

A dielectric film 16 is formed on the surface of the pixel electrodes 15. In the third embodiment, the dielectric film 16 is formed of the silicon oxide film or the silicon nitride film with the thickness of 400 nm or less.

The common electrodes 18 made of the ITO film are formed on the upper surface of the dielectric film 16. The common electrodes 18 can serve as a counter electrode about the pixel electrodes 15. The liquid crystal layer 6 can be driven by an electric field formed between the pixel electrodes 15 and the common electrodes 18. In addition, the common electrodes 18 are opposed to the pixel electrodes 15 through the dielectric film 16 and the holding capacitors 60 are formed therein.

Configuration of Electrical Connection between Common Electrodes and Wiring lines In the liquid crystal device 1 according to the third embodiment, the plurality of scanning lines 9a are drawn to a scanning line driving circuit (not shown) on the outer side of the display area V. A plurality of the wiring lines 17 electrically connected to. the common electrodes 18 are drawn to an outer area W. In the example shown in FIGS. 11 and 12B, the plurality of wiring lines 17 for the common electrodes 18 are drawn to the outer side more than the drawn wiring lines 9e of the scanning line 9a in the outer area W of the display area V.

Each of the wiring lines 17 includes a line-shaped portion 17a (a first portion) extending in a direction intersecting the extension direction of the common electrodes 18 and a planar portion 17b (a second portion) being connected to the line-shaped portion 17a and extending in the extension direction of the common electrodes 18. In the third embodiment, the plane-shape portions 17b extend from the line-shaped portions 17a on the same side as that of the display area V. A width W1 of the planar portions 17b in a direction perpendicular to the extension direction of the planar portions 17b is wider than a width W0 of the line-shaped portions 17a in a direction perpendicular to the extension direction of the line-shaped portions 17a.

The wiring lines 17 are a conductive film simultaneously formed with the scanning lines 9a and are formed between a gate insulating layer 81 and the interlayer insulating film 82.

In the liquid crystal device 1 configured in this way, when the common electrodes 18 and the wiring lines 17 are electrically connected to each other, a contact hole 49 (region where the dielectric film does not exist) is formed at a position in which the interlayer insulating layers 82 and 83 and the dielectric film 16 overlap the wiring line 17. In addition, the wiring line 17 is exposed in the bottom portion of the contact hole 49. Accordingly, in the third embodiment, the common electrodes 18 are drawn to a position overlapping the contact hole 49 and the wiring line 17 is electrically connected to common electrodes 18 through the contact hole 49. At this time, the common electrodes 18 intersect the drawn wiring lines 9e. However, since the interlayer insulating films 82 and 83 and the dielectric film 16 are interposed between the common electrodes 18 and the drawn wiring lines 9e, a short-circuit does not occur.

The common electrodes 18 intersect the wiring lines 17 electrically connected to other common electrodes 18. However, since the interlayer insulating films 82 and 83 and the dielectric film 16 are interposed between common electrodes 18 and the wiring lines 17, the short-circuit does not occur.

According to the third embodiment, since the dielectric film 19 is used to insulate the common electrodes 18, it is not necessary to further provide the insulating film. In addition, in the third embodiment, since the wiring lines 17 are connected to the plurality of common electrodes 18, a driving method of supplying different signals in the plurality of common electrodes 18 can be used.

The plurality of common electrodes 18 may be electrically connected to common wiring lines 17. In this case, when the common electrodes 18 and wiring lines 17 are electrically connected to each other, the configuration shown in FIGS. 11 and 12B can be used.

In the foregoing description, the common electrodes 18 and the wiring lines 17 are electrically connected to each other only on one side of the outer area w of the display area V for convenient description. However, the common electrodes 18 and the wiring lines 17 may be electrically connected to each other on both sides of the outer areas W with the display area V sandwiched therebetween.

Fourth Embodiment of Liquid Crystal Device

Figure 13A:
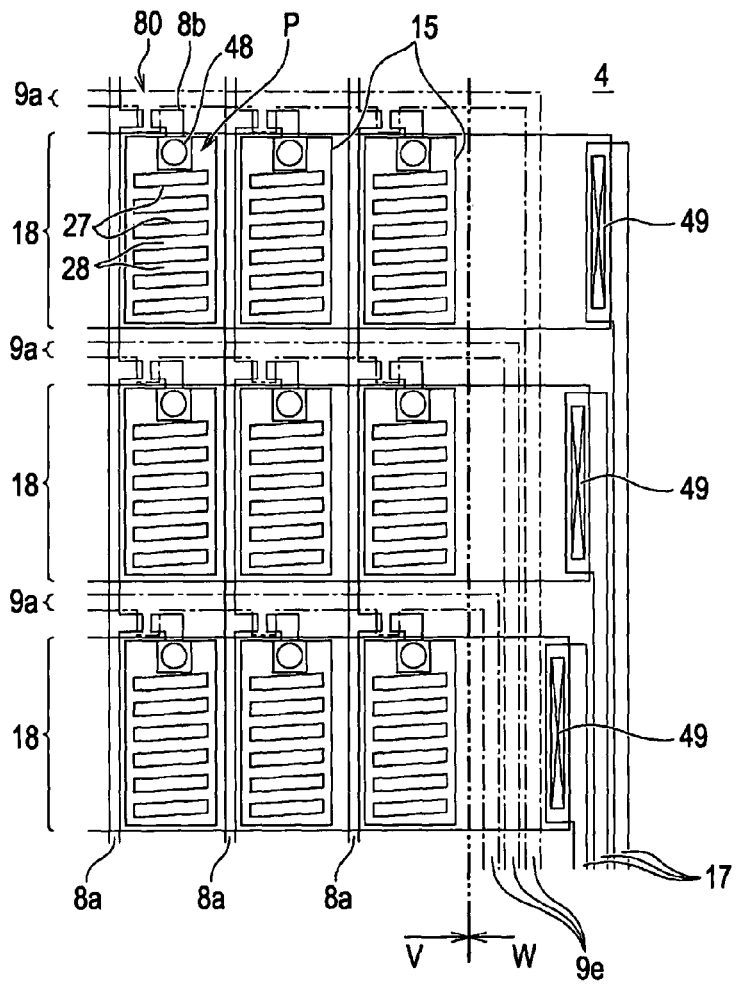
FIGS. 13A and 13B are a top view illustrating a plurality of sub-pixels on an element substrate used a liquid crystal device according to a fourth embodiment of the invention and a sectional view illustrating a configuration of connection portions between the common electrodes and wiring lines, respectively.
Figure 13B:
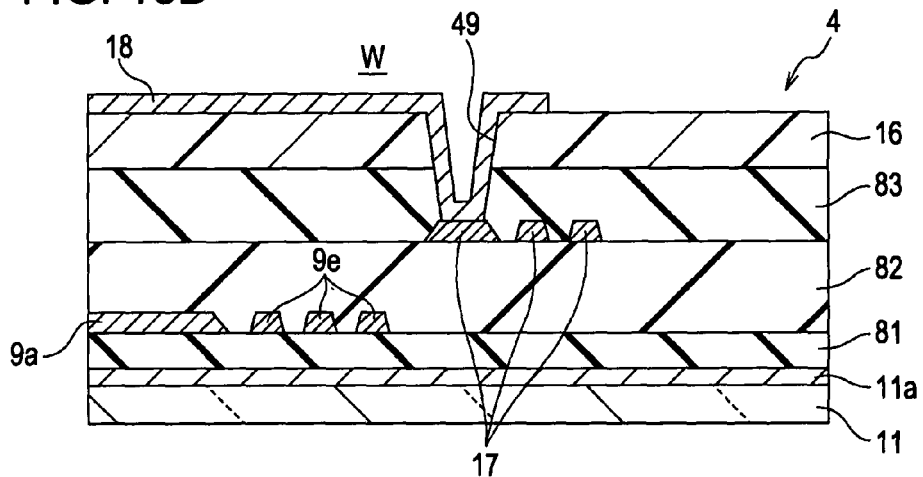

FIGS. 13A and 13B are a top view illustrating a plurality of sub-pixels on an element substrate used a liquid crystal device 1 according to the fourth embodiment of the invention and a sectional view illustrating a configuration of connection portions between the common electrodes and wiring lines, respectively. A general configuration according to the fourth embodiment is the same as that according to the third embodiment, and thus the same reference numerals are given to common elements. In addition, the configuration of the sub-pixels P will be described with reference to FIG. 12A and the like.

Like the third embodiment, as shown in FIGS. 13A and 13B, in the liquid crystal device 1, a plurality of wiring lines 17 electrically connected to the common electrodes 18 are also drawn in an outer area W. In this case, the plurality of wiring lines 17 for common electrodes 18 are drawn on a more outer side than drawn wiring lines 9e of a scanning line 9a in the outer area W of a display area V. Each of the wiring lines 17 includes a line-shaped portion 17a (a first portion) extending in a direction intersecting an extension direction of the common electrodes 18 and a planar portion 17b (a second portion) being connected to the line-shaped portion 17a and extending in the extension direction of the common electrodes 18. In the fourth embodiment, the planar portions 17b extend from the line-shaped portions 17a on the same side as that of the display area V.

The wiring lines 17 are conductive films simultaneously formed with the data line 8a described with reference to FIG. 12A and are formed between interlayer insulating films 82 and 83.

In the liquid crystal device 1 configured in this way, when the common electrodes 18 and the wiring lines 17 are electrically connected to each other, a contact hole 49 is formed at a position in which the interlayer insulating layer 83 and a dielectric film 16 overlap the wiring line 17. In addition, the wiring line 17 is exposed in the bottom portion of the contact hole 49. Accordingly, in the fourth embodiment, the common electrodes 18 are drawn to a position overlapping the contact hole 49 and the wiring line 17 is electrically connected to common electrodes 18 through the contact hole 49. At this time, the common electrodes 18 intersect the drawn wiring lines 9e. However, since the interlayer insulating films 82 and 83 and the dielectric film 16 are interposed between the common electrodes 18 and the drawn wiring lines 9e, a short-circuit does not occur. In addition, the common electrodes 18 intersect the wiring lines 17 electrically connected to other common electrodes 18. However, since the interlayer insulating films 82 and 83 and the dielectric film 16 are also interposed between common electrodes 18 and the wiring lines 17, the short-circuit does not occur. Therefore, since the dielectric film 19 is used to insulate the common electrodes 18, it is not necessary to further provide the insulating film. In the fourth embodiment, since the wiring lines 17 are connected to the plurality of common electrodes 18, a driving method of supplying different signals in the plurality of common electrodes 18 can be used.

The plurality of common electrodes 18 may be electrically connected to common wiring lines 17. In this case, when the common electrodes 18 and wiring lines 17 are electrically connected to each other, the configuration shown in FIGS. 11 and 12B can be used. In the foregoing description, the common electrodes 18 and the wiring lines 17 are electrically connected to each other only on one side of the outer area W of the display area V for convenient description. However, the common electrodes 18 and the wiring lines 17 may be electrically connected to each other on both sides of the outer areas W with the display area V sandwiched therebetween.

Fifth Embodiment of Liquid Crystal Device

Figure 14A:
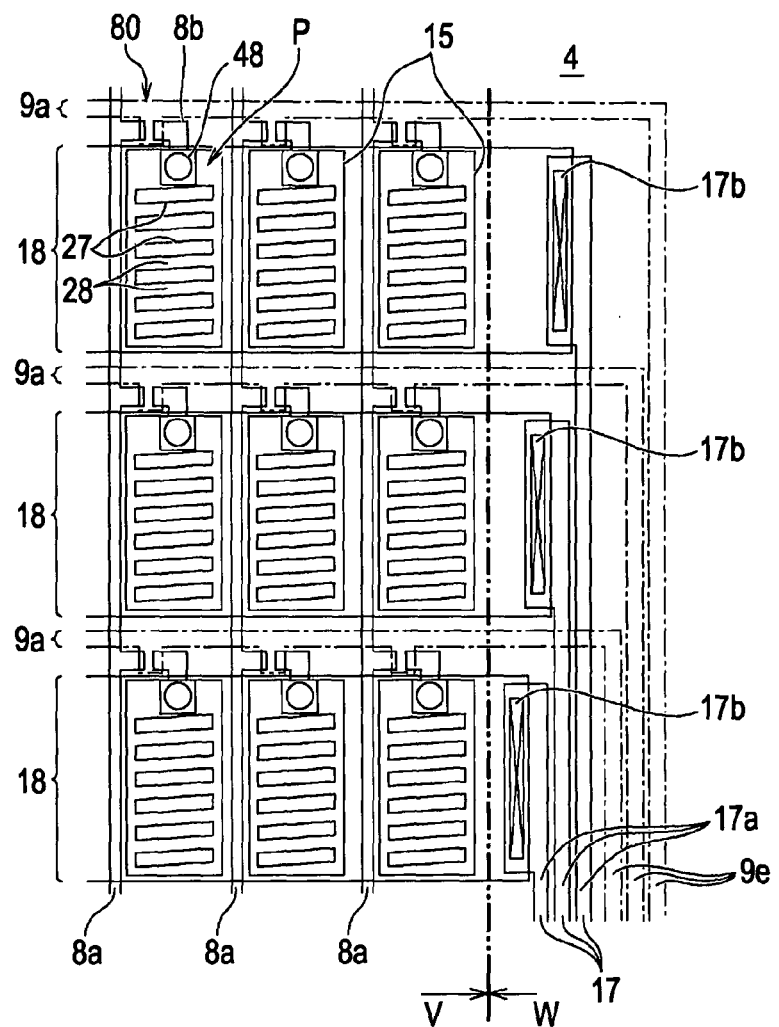
FIGS. 14A and 14B are a top view illustrating a plurality of sub-pixels on an element substrate used a liquid crystal device according to a fifth embodiment of the invention and a sectional view illustrating a configuration of connection portions between the common electrodes and wiring lines, respectively.
Figure 14B:
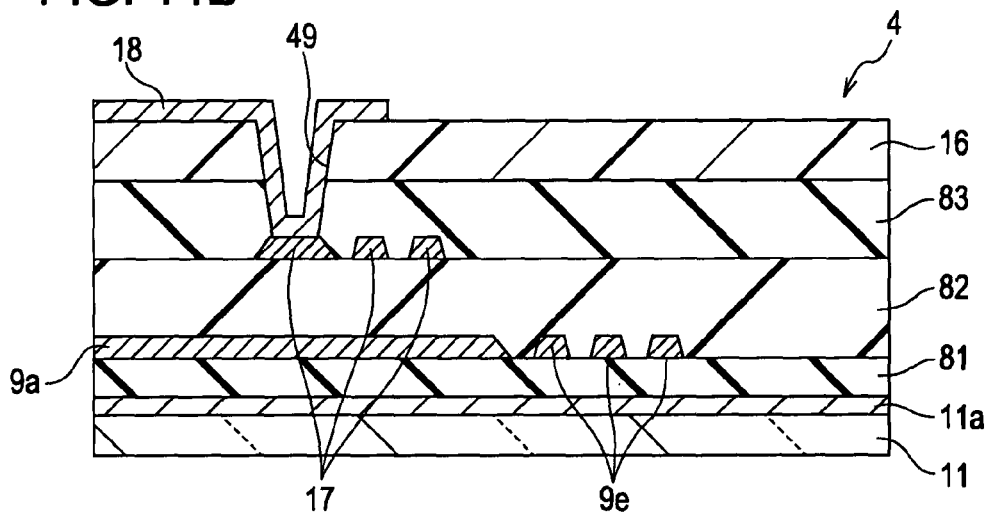

FIGS. 14A and 14B are a top view illustrating a plurality of sub-pixels on an element substrate used a liquid crystal device 1 according to a fifth embodiment of the invention and a sectional view illustrating a configuration of connection portions between the common electrodes and wiring lines, respectively. A general configuration according to the fifth embodiment is the same as that according to the third embodiment, and thus the same reference numerals are given to common elements. In addition, the configuration of the sub-pixels P will be described with reference to FIG. 12A and the like.

Like the third embodiment, as shown in FIGS. 14A and 14B, in the liquid crystal device 1, a plurality of wiring lines 17 electrically connected to the common electrodes 18 are also drawn in an outer area W. However, unlike the third embodiment, in this case, the plurality of wiring lines 17 for common electrodes 18 are drawn on an inner side than drawn wiring lines 9e of a scanning line 9a in the outer area W of a display area V. Each of the wiring lines 17 includes a line-shaped portion 17a (a first portion) extending in a direction intersecting an extension direction of the common electrodes 18 and a planar portion 17b (a second portion) being connected to the line-shaped portion 17a and extending in the extension direction of the common electrodes 18. In the fifth embodiment, the planar portions 17b extend from the line-shaped portions 17a on the same side as that of the display area V.

Like the fourth embodiment, the wiring lines 17 are conductive films simultaneously formed with the data line 8a described with reference to FIG. 12A and are formed between interlayer insulating films 82 and 83. Therefore, a contact hole 49 is formed at a position in which the interlayer insulating layer 83 and a dielectric film 16 overlap the wiring line 17. In addition, the common electrodes 18 and the wiring lines 17 are electrically connected to each other through the contact hole 49. At this time, the common electrodes 18 intersect the drawn wiring lines 9e. However, since the interlayer insulating films 82 and 83 and the dielectric film 16 are interposed between the common electrodes 18 and the drawn wiring lines 9e, a short-circuit does not occur. In addition, the common electrodes 18 intersect the wiring lines 17 electrically connected to other common electrodes 18. However, since the interlayer insulating films 82 and 83 and the dielectric film 16 are also interposed between common electrodes 18 and the wiring lines 17, the short-circuit does not occur. Therefore, since the dielectric film 19 is used to insulate the common electrodes 18, it is not necessary to further provide the insulating film.

Sixth Embodiment of Liquid Crystal Device

Figure 15:
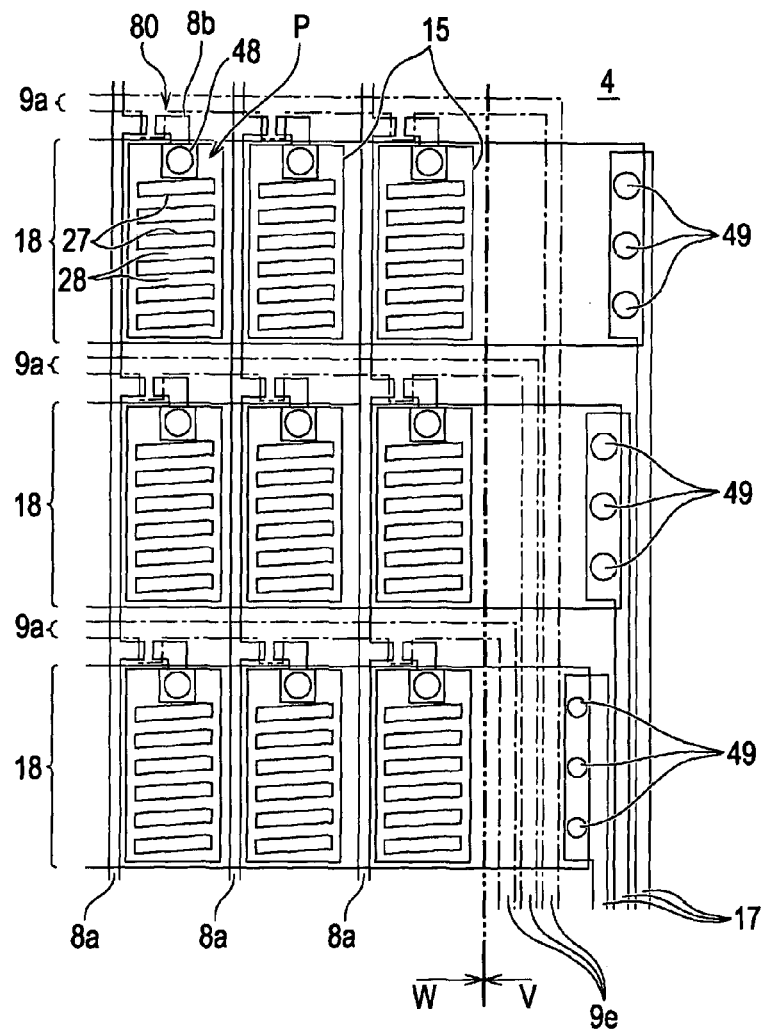
FIG. 15 is a top view illustrating a plurality of sub-pixels on an element substrate used a liquid crystal device according to a sixth embodiment of the invention.

FIG. 15 is a top view illustrating a plurality of sub-pixels on an element substrate used in a liquid crystal device 1 according to a sixth embodiment of the invention. A general configuration according to the sixth embodiment is the same as that according to the third embodiment, and thus the same reference numerals are given to common elements.

In the third embodiment, etc., one contact hole 49 with the rectangular shape in plan view is used to electrically connect the common electrodes 18 to the wiring lines 17. However, as shown in FIG. 15, for example, a plurality of the contact holes 19 with a circular shape in plan view may be used to electrically connect the common electrodes 18 to the wiring lines 17.

Seventh Embodiment of Liquid Crystal Device

Figure 16:
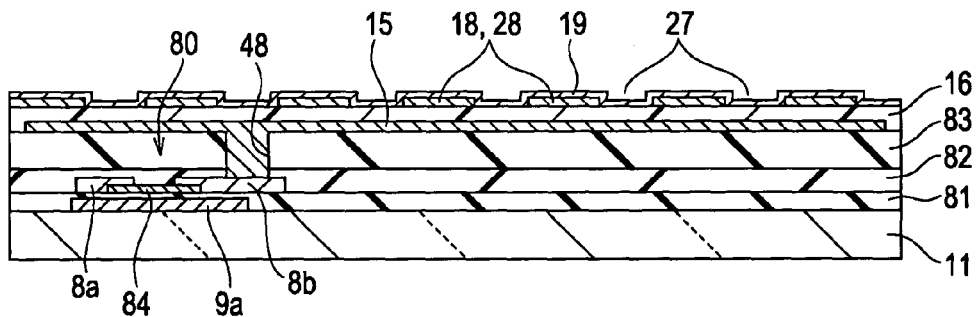
FIG. 16 is a sectional view illustrating thin-film transistors formed on an element substrate used a liquid crystal device 1 according to a seventh embodiment of the invention.

FIG. 16 is a sectional view illustrating thin-film transistors formed on an element substrate used a liquid crystal device 1 according to a seventh embodiment of the invention. In the third embodiment, etc., as the semiconductor, the poly silicon film has been used. However, as shown in FIG. 16, an amorphous silicon film may be used. In this case, in the element substrate 4, a ground protection film (not shown) formed of the silicon oxide film or the like is formed on the surface of a first substrate 11. In addition, scanning lines 9a, a gate insulating layer 81, a semiconductor film 84 formed of the amorphous silicon film, and the data lines 8a are sequentially formed on the surface of the first substrate 11. In addition, in the semiconductor film 84, thin-film transistors 80 with a bottom gate structure are formed so as to partially overlap the drain electrodes 8b which are on the same layer as the data lines 8a. An interlayer insulating film 82 formed of a silicon nitride film and an interlayer insulating film 83 formed of a photosensitive resin are formed on the upper side of the data lines 8a and the drain electrodes 8b. Pixel electrodes 15 formed of an ITO film are formed into an island on the surface of the interlayer insulating film 83. The pixel electrodes 15 are electrically connected to the drain electrodes 8b through contact holes 48 formed in the interlayer insulating films 82 and 83. A dielectric film 16 is formed on the surface of the pixel electrodes 15. In the seventh embodiment, the dielectric film 16 is formed of a silicon oxide film or a silicon nitride film with the thickness of 400 nm or less. Common electrodes 18 formed of an ITO film are formed on the upper side of the dielectric film 16. The common electrodes 18 serve as a counter electrode for the pixel electrodes 15 and can drive a liquid crystal layer 6 by use of an electric field generated between the pixel electrodes 15 and the common electrodes 18. In addition, slits 27 and line-shaped electrode portions 28 are formed in each of the common electrodes 18.

In the liquid crystal device 1 with the above-described configuration, the common electrodes 18 are electrically connected to wiring lines on an outer side of a display area. The wiring lines can use a conductive film on the same layer as the scanning lines 9a or the data lines 8a. Accordingly, in any case, the wiring lines can be electrically connected to the common electrodes 18 through the contact holes (area in which the dielectric layer 16 does not exist) formed through the dielectric layer 16 and the gate insulating layer 81.

Eighth of Embodiment of Liquid Crystal Device

In the above-described embodiments, the common electrodes 18 and the wiring lines 17 are directly connected to each other. However, the common electrodes 18 and the wiring lines 17 may be electrically connected to each other through relay electrodes. For example, in the configuration shown in FIG. 12B, the relay electrodes simultaneously formed with the data lines and the common electrodes 18 may be electrically connected to each other through contact holes passing through the interlayer insulating film 83 and the dielectric film 18. At this time, the wiring lines 17 simultaneously formed with the scanning lines and the relay electrodes may be electrically connected to each other through contact holes passing through the interlayer insulating film 82 and the gate insulating layer 81. In this case, the contact holes (area in which the dielectric layer 16 does not exist) through which the relay electrodes and the common electrodes 18 are electrically connected to each other may overlap the contact holes through which the relay electrodes and the wiring lines are electrically connected to each other in plan view. Moreover, the contact holes (area in which the dielectric layer 16 does not exist) may be deviated from the contact holes through which the relay electrodes and the wiring lines are electrically connected to each other in plan view.

In the case of such a configuration, contact holes in which the dielectric film is removed in the thickness direction thereof are not formed at a position overlapping the wiring lines in plan view. However, in the dielectric film, contact holes in which the dielectric film is removed in the thickness direction thereof are formed at a position overlapping the common electrodes in plan view. In addition, the common electrodes are electrically connected to the wiring lines through the contact holes.

Other Embodiments

The preferable embodiments of the invention have been described above. However, the invention is not limited to the embodiments, but may be modified in various forms within the scope of the invention disclosed in the claims. For example, in the above-described embodiments, as shown in FIG. 1 or 8, the slits 27 and the line-shaped electrode portions 28 are formed in the common electrodes 18 which are the strip-shaped electrodes. In addition, the electric field parallel to the substrate and the inclined electric field generated in the fringe field area are generated by the slits 27 and the pixel electrodes 15 opposite the line-shaped electrode portions 28. The slits 27 and the line-shaped electrode portions 28 are formed in every area (that is, the area correspond to each of the sub-pixels P) corresponding to each of the pixel electrodes 15. However, Instead of such a configuration, the slits 27 and the line-shaped electrode portions 28 may be formed continuously over the plurality of sub-pixels P.

When the slits 27 and the line-shaped electrode portions 28 are formed every the sub-pixel P, the area of the common electrodes 18 can be ensured. Accordingly, low resistance of the wiring lines of the common electrodes 18 can be maintained. Alternatively, when the slits 27 and the line-shaped electrode portions 28 are formed continuously over the plurality of sub-pixels P, patterning of the slits 27 and the line-shaped electrode portions 28 can be easily performed.

In this embodiment, as liquid crystal molecules forming the liquid crystal layer 6 shown in FIG. 2 or 9, nematic liquid crystal molecules having a positive dielectric anisotropy are used. Instead of the nematic liquid crystal molecules having positive dielectric anisotropy, nematic liquid crystal molecules having a negative dielectric anisotropy may be used. In any case, it is possible to obtain an appropriate initial alignment of the liquid crystal molecules for the FFS mode by determining an appropriate rubbing direction. Generally, the appropriate rubbing directions are different by 90° in the cases.

First Embodiment of Electronic Apparatus

Figure 17:
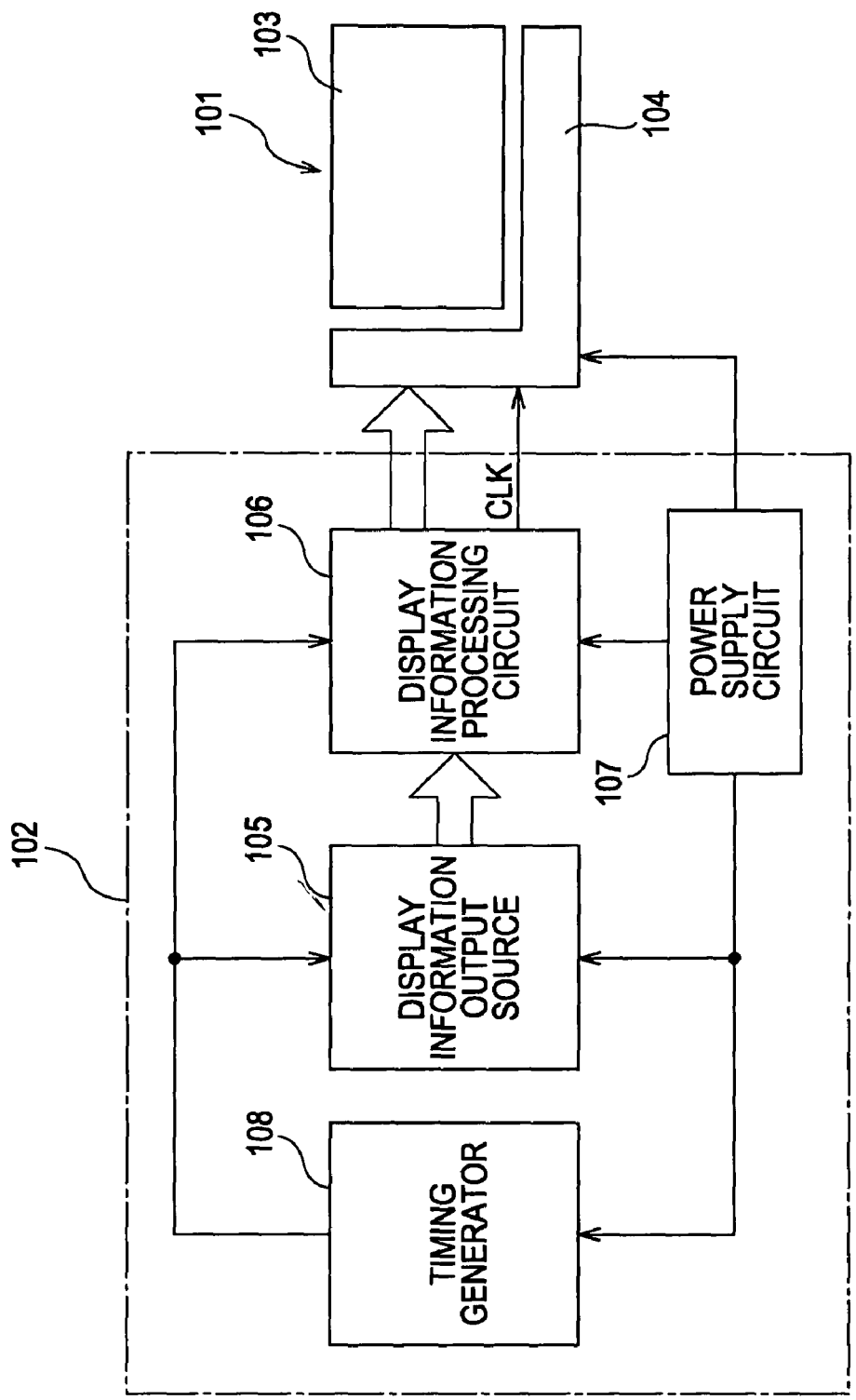
FIG. 17 is a block diagram illustrating an electronic apparatus according to a first embodiment of the invention.

Next, an electronic apparatus according to a first embodiment of the invention will be described. The first embodiment is just one example of the invention and the invention is not limited thereto. FIG. 17 is a block diagram illustrating an electronic apparatus according to the first embodiment of the invention. The electronic apparatus includes a liquid crystal device 101 and a control circuit 102 for controlling the liquid crystal device 101. The liquid crystal device 101 includes a liquid crystal panel 103 and a driving circuit 104. In addition, the control circuit 102 includes a display information output source 105, a display information processing circuit 106, a power supply circuit 107, and a timing generator 108.

The display information output source 105 includes a memory such as a random access memory (RAM), a storage unit such as various types of disc, a tuning circuit for tuning a digital image signal, etc. In addition, the display information output source 105 supplies display information such as an image signal of a predetermined format to the display information processing circuit 106 on the basis of various clock signals generated by the timing generator 108.

The display information processing circuit 106 includes known circuits such as an amplifying/inverting circuit, a rotation circuit, a gamma correction circuit, or a clamp circuit. In addition, the display information processing circuit 106 performs input display information and supplies the image signal and a clock signal CLK to the driving circuit 104. The driving circuit 104 is a general circuit of a detection circuit or the like in addition to a scanning line driving circuit or a data line driving circuit. In addition, the power supply circuit 107 supplies a predetermined power supply voltage to the above-described elements.

The liquid crystal device 101 can be formed by the liquid crystal device 1 described with reference to FIGS. 1 to 16. In the liquid crystal device 1, the FFS mode can be realized by using the TFD element 13 or the thin-film transistor 80 as a switching element. When the TFD element is used as the switching element, manufacture of the liquid crystal device 1 can be simplified at low cost. In addition, since the common electrodes 18 and the wiring lines 17 are electrically insulated from each other by the dielectric film 16 between the pixel electrodes 15 and the common electrodes 18, it is possible to easily realize a configuration for electrically insulating the wiring lines 17 from the common electrodes 18. Moreover, since the liquid crystal device 1 is a FFS mode liquid crystal device, it is possible to achieve a wide viewing angle and a high-contrast display suitable for the display device of the electronic apparatus.

Second Embodiment of Electronic Apparatus

Figure 18:
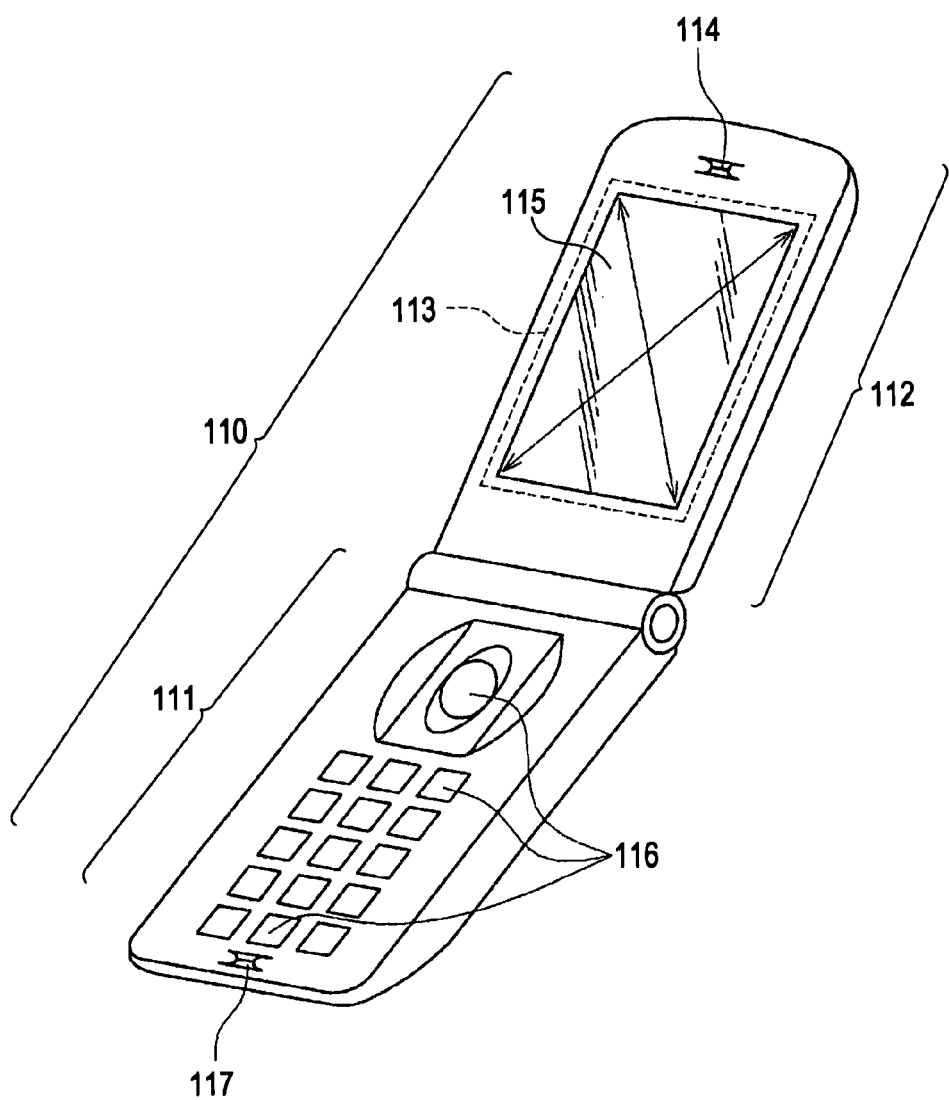
FIG. 18 is a diagram illustrating a cellular phone as another electronic apparatus according to a second embodiment of the invention.

FIG. 18 is a diagram illustrating a cellular phone as another electronic apparatus according to a second embodiment of the invention. A cellular phone 110 shown in FIG. 18 includes a body portion 111 and a display portion 112 provided so as to be closed or opened about the body portion 111. A display device 113 and an ear piece 114 are formed in the display portion 112. Various displays for communication are displayed on a display screen 115 of the display device 113. A control unit for controlling an operation of the display device 113 is a part of a control unit for controlling the entire of the cellular phone or is held in the body portion 111 or the display portion 112 as a separate element. Operational buttons 116 and a mouth piece 117 are provided in the body portion 111.

The display device 113 can be formed of the liquid crystal device 1 described with reference to FIGS. 1 to 16. In the liquid crystal device 1, the FFS mode can be realized by using the TFD element 13 or the thin-film transistor 80 as a switching element. When the TFD element is used as the switching element, manufacture of the liquid crystal device 1 can be simplified at low cost. In addition, since the common electrodes 18 and the wiring lines 17 are electrically insulated from each other by the dielectric film 16 between the pixel electrodes 15 and the common electrodes 18, it is possible to easily realize a configuration for electrically insulating the wiring lines 17 from the common electrodes 18. Moreover, since the liquid crystal device 1 is a FFS mode liquid crystal device, it is possible to achieve a wide viewing angle and a high-contrast display suitable for the display device of the electronic apparatus.

The preferable embodiments of the invention have been described above. However, the invention is not limited to the embodiments, but may be modified in various forms within the scope of the invention disclosed in the claims. For example, the invention is not limited to the cellular phone, but may be applied to various electronic apparatuses such as a personal computer, a liquid crystal TV, a view finder type or monitor direct vision-type video tape recorder, a car navigation apparatus, a pager, an electronic pocket book, a calculator, a word processor, a work station, a television phone, a POS terminal, a digital camera, or an electronic pocket book.

The entire disclosure of Japanese Patent Application Nos. 2007-066294, filed Mar. 15, 2007 and 2007-250751, Sep. 27, 2007 are expressly incorporated by reference herein.

What is claimed is:

1. A liquid crystal device comprising:
a first substrate; and
a second substrate disposed opposite of the first substrate; and
a liquid crystal layer interposed between the first substrate and the second substrate;
wherein the first substrate includes:
(a) a plurality of signal lines extending in parallel on the first substrate;
(b) a switching element electrically connected to at least one of the signal lines;
(c) a plurality of first electrodes on the first substrate in a direction of the signal lines and in a direction intersecting the extension direction of the signal lines, at least one of the first electrodes being electrically connected to the switching element;
(d) a wiring line;
(e) a dielectric film having an end side, the dielectric film covering:
(i) the plurality of first electrodes;
(ii) the switching element; and
(iii) the wiring line; and
(f) a plurality of second electrodes which are strip-shaped electrodes extending in the direction intersecting the extension direction of the signal lines and overlapping the plurality of first electrodes in plan view, a plurality of the second electrodes being arranged in parallel at a predetermined interval in the extension direction of the signal lines, the plurality of second electrodes being disposed on the dielectric film so as to be opposite at least one of the first electrodes, at least one second electrode:
(i) extending from the end side of the dielectric film toward an area where the dielectric film does not exist; and
(ii) being electrically connected to the wiring line through the area where the dielectric film does not exist.

2. The liquid crystal device of claim 1, wherein the at least one second electrode is electrically connected directly to the wiring line.

3. The liquid crystal device of claim 1, wherein:
(a) the wiring line has a portion exposed from an end of the dielectric film in plan view; and
(b) the at least one second electrode is electrically connected to the portion of the wiring line exposed from the end of the dielectric film.

4. The liquid crystal device of claim 1, wherein:
(a) a contact hole in which the dielectric film is removed in a thickness direction thereof is formed; and
(b) the at least one second electrode is electrically connected to the wiring line through the contact hole.

5. The liquid crystal device of claim 1, wherein:
(a) a contact hole in which the dielectric film is removed in a thickness direction thereof is formed at a position of the dielectric film overlapping the at least one second electrode in plan view; and
(b) the at least one second electrode is electrically connected to the wiring line through the contact hole.

6. The liquid crystal device of claim 1, wherein the switching element is a two-terminal switching element including a first conductive film, an insulating film disposed on the first conductive film, and a second conductive film disposed on the insulating film.

7. The liquid crystal device of claim 6, wherein the wiring line is formed on the same layer as one of the first conductive film and the second conductive film.

8. The liquid crystal device of claim 7, wherein:
(a) a display area is formed by an area in which a plurality of sub-pixels where a plurality of the first electrodes and a plurality of the second electrodes overlap each other in plan view are arranged, the plurality of second electrodes including a portion outside the display area in plan view; and
(b) the wiring lines are disposed in the portion.

9. The liquid crystal device of claim 8, wherein the wiring lines are disposed on both sides of the display area in the area outside the display area.

10. The liquid crystal device of claim 8, wherein each of the wiring lines has:
   (a) a first portion extending in the direction intersecting the extension direction of the second electrodes; and
   (b) a second portion connected to the first portion so as to extend in a direction parallel to the second electrodes.

11. The liquid crystal device of claim 10, wherein:
   (a) the first substrate has an end side; and
   (b) the second portion extends from the first portion to the end side.

12. The liquid crystal device of claim 10, wherein the second portion extends from the first portion to a side of the display area.

13. The liquid crystal device of claim 10, wherein a width W1 of the second portion in a direction perpendicular to the extension direction of the second portion is larger than a width W0 of the first portion in a direction perpendicular to the extension direction of the first portion.

14. The liquid crystal device of claim 1, wherein the switching element is a three-terminal switching element which has a semiconductor layer including a source region electrically connected to the signal line, a channel region, and a drain region electrically connected to the first electrode and a gate electrode opposite the channel region with a gate insulating layer interposed therebetween.

15. The liquid crystal device of claim 14, wherein the wiring line is formed on the same layer as one of the gate electrode and the signal line.

16. The liquid crystal device of claim 1, wherein the second electrodes have a plurality of line-shaped electrode portions arranged in parallel with gaps there among in areas opposite the first electrodes.

17. The liquid crystal device of claim 16, wherein the gaps and the line-shaped electrode portions of the second electrodes are formed every sub-pixel.

18. The liquid crystal device of claim 16, wherein the gaps and the line-shaped electrode portions of the second electrodes are formed continuously over the plurality of sub-pixels.

19. The liquid crystal device of claim 16, wherein a part or all of the line-shaped electrode portions of the second electrodes overlap the first electrodes in plan view.

20. The liquid crystal device of claim 16, wherein the first electrodes are a planar electrode having no gaps.

21. The liquid crystal device of claim 16, further comprising:
   a first alignment film and a first polarizing layer disposed on the first substrate; and
   a second alignment film and a second polarizing layer disposed on the second substrate,
   wherein the first alignment film and the second alignment film are subjected to a rubbing process, and $5°\leq\alpha\leq20°$ is satisfied where an angle formed by the rubbing direction and an extension direction of the line-shaped electrode portions is $\alpha$,
   wherein an extension direction of a polarizing transmission axis of the first polarizing layer is parallel to the rubbing direction of the first alignment film,
   wherein the rubbing direction of the second alignment film is anti-parallel to the rubbing direction of the first substrate, and
   wherein an extension direction of a polarizing transmission axis of the second polarizing layer is perpendicular to the extension direction of the polarizing transmission axis of the first polarizing layer.

22. The liquid crystal device of claim 1, wherein the liquid crystal layer is formed of nematic liquid crystal molecules having a positive dielectric anisotropy.

* * * * *